(12) United States Patent
Coombes et al.

(10) Patent No.: US 9,788,396 B2
(45) Date of Patent: Oct. 10, 2017

(54) DIMMING GATEWAY AUTO DISCOVERY SYSTEM

(71) Applicant: Gooee Limited, St Albans (GB)

(72) Inventors: Simon Coombes, St Petersburg, FL (US); Jonathan Couch, Wilshire (GB); Andrew Johnson, Klosters (CH); Shmuel Silverman, Novato, CA (US)

(73) Assignee: Gooee Limited (GB)

( * ) Notice: Subject to any disclaimer, the term of this patent is extended or adjusted under 35 U.S.C. 154(b) by 0 days.

(21) Appl. No.: 15/453,872

(22) Filed: Mar. 8, 2017

(65) Prior Publication Data
US 2017/0265283 A1  Sep. 14, 2017

Related U.S. Application Data

(63) Continuation of application No. 15/344,263, filed on Nov. 4, 2016.
(Continued)

(51) Int. Cl.
*H05B 37/02* (2006.01)
*H05B 33/08* (2006.01)
(Continued)

(52) U.S. Cl.
CPC ......... *H05B 37/0263* (2013.01); *H04L 12/66* (2013.01); *H04L 67/12* (2013.01);
(Continued)

(58) Field of Classification Search
CPC ............ H05B 37/0272; H05B 37/0227; H05B 37/0254; H05B 33/0845; H05B 41/2981;
(Continued)

(56) References Cited

U.S. PATENT DOCUMENTS

| 3,971,065 A | 7/1976 | Bayer |
| 4,245,241 A | 1/1981 | Sato et al. |

(Continued)

FOREIGN PATENT DOCUMENTS

| DE | 102012210743 A1 | 1/2014 |
| WO | WO-2009104135 A1 | 8/2009 |

(Continued)

OTHER PUBLICATIONS

Lighting Research Center, Assist: Alliance for Solid-State Illumination Systems and Technologies, Feb. 15, 2005, 2 pages, http://www.lrc.rpi.edu/programs/solidstate/assist/index.asp.

(Continued)

*Primary Examiner* — Haissa Philogene
(74) *Attorney, Agent, or Firm* — Lisa J. Moyles; Janelle A. Bailey

(57) ABSTRACT

A system and method for discovering at least one dimming control protocol installed in a plurality of lighting devices and for controlling a plurality of dimming levels of the plurality of lighting devices are disclosed. The system may include at least one gateway that connects to at least one plurality of luminaires and/or LED's, at least one sensor subsystem and at least one power meter. The system and method may exchange information between a plurality of light devices and a self-organized, self-discovering gateway device. The gateway may use one or more known control protocols as an input and is able to handle multiple light devices that support different control protocols. This ability makes the gateway a universal lighting control gateway.

20 Claims, 16 Drawing Sheets

Related U.S. Application Data

(60) Provisional application No. 62/306,535, filed on Mar. 10, 2016.

(51) Int. Cl.
*H04L 12/66* (2006.01)
*H04L 29/08* (2006.01)

(52) U.S. Cl.
CPC ..... *H05B 33/0869* (2013.01); *H05B 33/0872* (2013.01); *H05B 33/0884* (2013.01); *H05B 37/0218* (2013.01); *H05B 37/0245* (2013.01)

(58) Field of Classification Search
CPC ............ H05B 41/3921; H05B 37/0218; H05B 37/029; H04L 12/2807; H04L 12/2836; H04L 12/66; H04L 12/2818; H04W 88/16; H04W 4/06
USPC ............... 315/149, 153, 155, 297, 307, 312; 370/401
See application file for complete search history.

(56) References Cited

U.S. PATENT DOCUMENTS

| | | | |
|---|---|---|---|
| 5,770,928 A | 6/1998 | Chansky et al. | |
| 7,248,297 B2 | 7/2007 | Catrysse et al. | |
| 7,777,427 B2 | 8/2010 | Stalker, III | |
| 7,893,632 B2 | 2/2011 | Meijer et al. | |
| 7,950,832 B2 | 5/2011 | Tanaka et al. | |
| 8,319,452 B1 | 11/2012 | Hamel et al. | |
| 8,643,304 B2 | 2/2014 | Hamel et al. | |
| 8,729,834 B1 | 5/2014 | Funderburk et al. | |
| 8,928,232 B2 | 1/2015 | Aggarwal et al. | |
| 9,084,308 B2 | 7/2015 | Morrow | |
| 9,131,581 B1 | 9/2015 | Hsia et al. | |
| 9,148,936 B2 | 9/2015 | Wagner et al. | |
| 9,408,280 B2 * | 8/2016 | Schroder | H05B 37/0272 |
| 9,521,733 B2 * | 12/2016 | Brand | H05B 41/2981 |
| 9,655,197 B1 * | 5/2017 | Coombes | H04W 88/16 |
| 2014/0320022 A1 | 10/2014 | Lee | |
| 2014/0375221 A1 | 12/2014 | Mans et al. | |
| 2016/0014867 A1 | 1/2016 | Luk | |
| 2016/0360594 A1 | 12/2016 | Chemel | |

FOREIGN PATENT DOCUMENTS

| | | |
|---|---|---|
| WO | WO-2015108489 A1 | 7/2015 |
| WO | WO-2015177762 A2 | 11/2015 |

OTHER PUBLICATIONS

DALI, Discover DALI—Excellent System Performance, Mar. 31, 2014, 5 pages, http://dali-ag.org/discover-dali.html.

U.S. Department of Energy, LED Measurement Series: LED Luminaire Reliability, Oct. 2009, 4 pages, www.ssl.energy.gov.

Kevin Dowling, PhD, Lumen Maintenance IESNA LM-80/2008, Oct. 30, 2008, 16 pages, www1.eere.energy.gov/buildings/publications/pdfs/ss1/lm80-webcast_10-30-08.pdf.

M-CAM Patently Obvious, Kodak's Final Gasp? Intellectual Property Analysis of Kodak v Apple, HTC, Jan. 13, 2012, 8 pages, http://www.globalinnovationcommons.org.

Jeff McCullough, LC, Pacific NW National Lab, Energy Star® Webinar:Requirements for Lumen Maintenance, Oct. 30, 2008, 18 pages, www1.eere.energy.gov/buildings/publications/pdf.

Philips, Understanding power LED Lifetime analysis, Technology White Paper, Dec. 5, 2016, 11 pages, www.lrc.rpi.edu/programs/solidstate/assist/index.asp.

Claire Swedberg, IoT Lights Up Streets with Smart City Initiative, RFID Journal, Jul. 23, 2015, 3 pages, http://www.iotjournal.com/articles/view?13303.

International Search Report and Written Opinion of International App. No. PCT/IB2017/051386, which is in the same family as U.S. Appl. No. 15/344,263, dated Jun. 6, 2017, 12 pages.

\* cited by examiner

DIMMING GATEWAY AUTO DISCOVERY SYSTEM

CROSS-REFERENCE TO RELATED APPLICATIONS

This application claims priority to U.S. application Ser. No. 15/344,263 filed Nov. 4, 2016, and claims the benefit of U.S. Provisional Application No. 62/306,535 filed Mar. 10, 2016, each of which are incorporated herein by reference in their entireties.

FIELD

A system for controlling lighting devices using multiple standard protocols is generally described. In particular, a system and a method for exchanging information between a plurality of lighting devices and a self-discovery gateway device are disclosed.

BACKGROUND

Lighting control systems are often used to set up and/or control lighting scenes. The systems often switch/alternate between and dim luminaires, and manage them in space and time. Due to the large scale and increased number of luminaires associated with these systems, there is a strong need to provide controllable and user-friendly systems. The user-friendly features of these systems often include easy programming and operation, along with simple installation processes. There is also a demand to balance this need by economic considerations. These economic considerations may be challenging to meet with an increased number of luminaires, particularly because large control systems that are predominantly digitally-based, and used to manage the increased number of luminaires, are often designed to allow the luminaires to be addressed individually in an effort to provide great flexibility.

Lighting control systems can be integrated as a subsystem into a building management system. A lighting control network typically consists of one or more lighting devices, such as, for example, electrical ballast, light emitting diodes (LED) devices, and dimmers. The dimmers must support specific interfaces to be able to receive control inputs and dim the lights appropriately. Different light devices may support different control interfaces.

Multiple standards have been developed since the early 1970's to allow standard control of light dimmers, through the use of light dimming and light control methods. The standards include, but are not limited to, 0-10 VDC, 1-10 VDC, AMX192, K92, A240, CMX, ECmux, Tmux, D54, and DMX512. Some of the original protocols, such as, 0-10 VDC and 1-10 VDC, are still in wide use today, as well as new additions, including DALI, DALI Color, DMX and DMX-RDM.

Race to market and cost reduction requirements have led to the creation of numerous multiplex protocols to handle the dimming devices. However, these protocols are often manufacturer-specific and include proprietary schemes related to console-to-dimmer data communication, which are used to control the dimmers. Because most of these protocols were created in the early 1980s, which coincided with increased demand in the entertainment and architectural lighting markets, dimmer-per-circuit systems became the industry standard. Years later, however, while most of the control consoles became obsolete, the dimmers were not, which has left many dimmer standard interfaces in play.

Analog point-to-point control standards 0V-10V and/or 1V-10V send signals to the luminaires based on changing the voltage between 1V-10V and 0V-10V. This technology is widely used in low-complexity lighting systems. The dimmer setting is often signaled via a separate control line. Controllers, such as electrical controllers, are used to regulate the output of light from the luminaire. Since this type of electrical control is not addressable, the control circuit for the control line must be electrically planned and its allocation cannot be changed. The circuits in the electrical installation determine the grouping of the luminaires. Any change of use requires a new arrangement of the connection and control lines. Feedback on lamp failure, etc., via the control lines, is not possible with the 0-10V and 1V-10V technology.

The Digital Multiplexed (DMX) digital control protocol is predominantly used for stage lighting. In architectural lighting, this protocol is used for features such as media facades or stage-like room lighting effects. The data is transmitted via a dedicated 5-core cable at a transfer rate of 250 Kbits/s, which can control up to 512 channels. This protocol requires that each luminaire has an address bus. When using multi-channel devices with color control and other adjustable features, each function requires a separate address. For a long time, the data transfer was unidirectional and only enabled the control of devices. It did not provide feedback on aspects such as lamp failure. The DMX 512-A version now allows for bidirectional communication.

Digital Addressable Lighting Interface (DALI) is a control protocol that makes it possible to control luminaires, each luminaire having its respective DALI control gear. The system may allow user-friendly light management in architecture and may also be integrated as a subsystem into modern building control systems. It often includes a two-wire control line with a transfer rate of 1.2 Kbits/s, each wire being able to run together with a main supply cable in a S-core cable. The bidirectional system may allow feedback from the luminaires on different aspects, such as, for example, lamp failure. The DALI protocol often limits the number of devices to 64. The standard version stores the settings for a maximum of 16 luminaire groups and 16 light scenes within the control gear. General information on DALI is found at www.dali-ag.org. Amongst other features, DALI supports emergency testing with feedback on the life of the battery.

Many manufacturers are providing protocol converters between one-to-one and more protocols, however, the convertors need to be set to a specific protocol. The setup is often done manually or at a factory. Some digital controllers are connected to computer systems or to a console, which may allow the setup to be done in the console and be sent to the controller. A disadvantage with this arrangement, is that the set up is often complex and includes numerous variables associated with it, such as, the number of luminaires connected in a group and the desired effect associated with the dimming of the light, sensor information, ambiance, color temperature, and more.

The large number of LED and electric ballast devices installed in a customer site requires the installer to either limit the dimming protocols to a manageable number (most likely one) or to be able to support a plurality of dimming protocols. The act of limiting the dimming protocols also limits the options for customers to find alternative manufacturers and reduce cost of installation and maintenance. Further, allowing multiple dimming protocols causes maintenance and installation challenges, particularly because each new lighting device and/or change of a lighting device, needs to be introduced to a network of controllers and managed. One cannot simply install the new lighting device without proper network management, or the desired dimming results in that area will be impacted.

According to the disadvantages described above, there is a need for a device and method that allows an end-user/customer to use multiple standard protocols for lighting dimming and lighting control needs.

Further, there is a need for a system and method that provides lighting dimming and lighting control, without requiring the knowledge of a specific protocol to be set prior or during manual to installation. Each and every system disclosed above is intended to provide enhanced customer satisfaction in a plurality of industries such as healthcare, fitness, retail, home and entertainment industries.

There is thus a need for a system and a method that is dimming protocol agnostic (e.g., open to any protocol) to allow multiple different dimming protocols to coexist in a lighting network. The universal lighting control gateway system solves this problem. It allows customers to be agnostic of the dimming protocols of their LEDs and/or electrical ballasts. When a new LED system or electrical ballast is installed, the gateway detects the correct protocol that is handled by the lighting device and allows smooth transition between protocols with no need for an operator or manual intervention.

SUMMARY

This disclosure relates to a system and a method of exchanging information between a plurality of lighting devices and a gateway. According to an aspect, the gateway can use a plurality of digital control protocols, or messages, as its input. Regardless of the specific control protocol known to the lighting devices, the gateway is able to control the plurality of lighting devices using control protocols that are native to the controlled lighting devices. This ability makes the gateway a universal lighting control gateway.

In one aspect, the present application provides a system for discovering at least one dimming control protocol installed in a plurality of lighting devices and for controlling a plurality of dimming levels of the plurality of lighting devices. According to an aspect, the system includes at least one protocol agnostic Universal Smart Lighting Gateway (USLG), at least one of a plurality of luminaires and a plurality of LED's, at least one sensor subsystem, and at least one power meter for measuring power in real time. The USLG may be capable of discovering the at least one dimming control protocol installed in the plurality of lighting devices and controlling the dimming levels of the plurality of lighting devices. In an embodiment, at least one of the plurality of luminaires and the plurality of LED's is physically connected to the agnostic USLG via at least one dimming control interface. The sensor subsystem senses a plurality of color channels and monitors at least one change in environment in real time. According to an aspect, the sensor subsystem is connected with the at least one of the protocol agnostic USLG along with the plurality of luminaires and the plurality of LED's. In an embodiment, the at least one power meter is connected with the at least one of the protocol agnostic USLG along with the plurality of luminaires and the plurality of LED's.

In another aspect, the present application is directed to a method of discovering at least one dimming control protocol installed in a plurality of lighting devices and controlling dimming levels of the plurality of lighting devices. The method may include assuming a dimming control protocol installed in at least one of a plurality of luminaires and a plurality of LED's. In an embodiment, the assuming is performed by at least one protocol agnostic USLG. The method may further include receiving at least one real time sensing measurement from at least one sensor subsystem, and receiving at least one real time power measurement from at least one power meter. According to an aspect, the at least one sensor subsystem is physically connected to the agnostic USLG, and the real time sensing measurement is received by the at least one agnostic USLG via at least one sensor interface. In an embodiment, the at least one power meter is physically connected to the at least one agnostic USLG, and the real time power measurement is received by the at least one agnostic USLG via at least one power interface. The method may further include transmitting at least one dimming control command based on the real time sensing measurement and the at least one real time power measurement to generate a result, towards at least one of the plurality of luminaires and the plurality of LED's. The dimming control command may be transmitted by the at least one agnostic USLG via at least one dimming control interface during a protocol discovery process. According to an aspect, the method further includes measuring at least one generated result via the at least one sensor subsystem and/or the at least one power meter, discovering the at least one dimming control protocol installed in at least one of the plurality of luminaires and the plurality of LED's, and controlling a dimming level of at least one of the plurality of luminaires and the plurality of LED's. In an embodiment, the generated result is measured by the agnostic USLG, the dimming control protocol is discovered by the agnostic USLG, and the dimming level is controlled by the agnostic USLG.

Embodiments in accordance with the present disclosure enables an operator or factory to set the default protocol or allow failure in case a protocol cannot be identified during the discovery process. These and other advantages will be apparent from the present application of the embodiments described herein.

BRIEF DESCRIPTION OF THE FIGURES

The above and still further features and advantages of embodiments of the present disclosure will become apparent upon consideration of the following detailed description of embodiments thereof, especially when taken in conjunction with the accompanying drawings, wherein.

Figure 1:
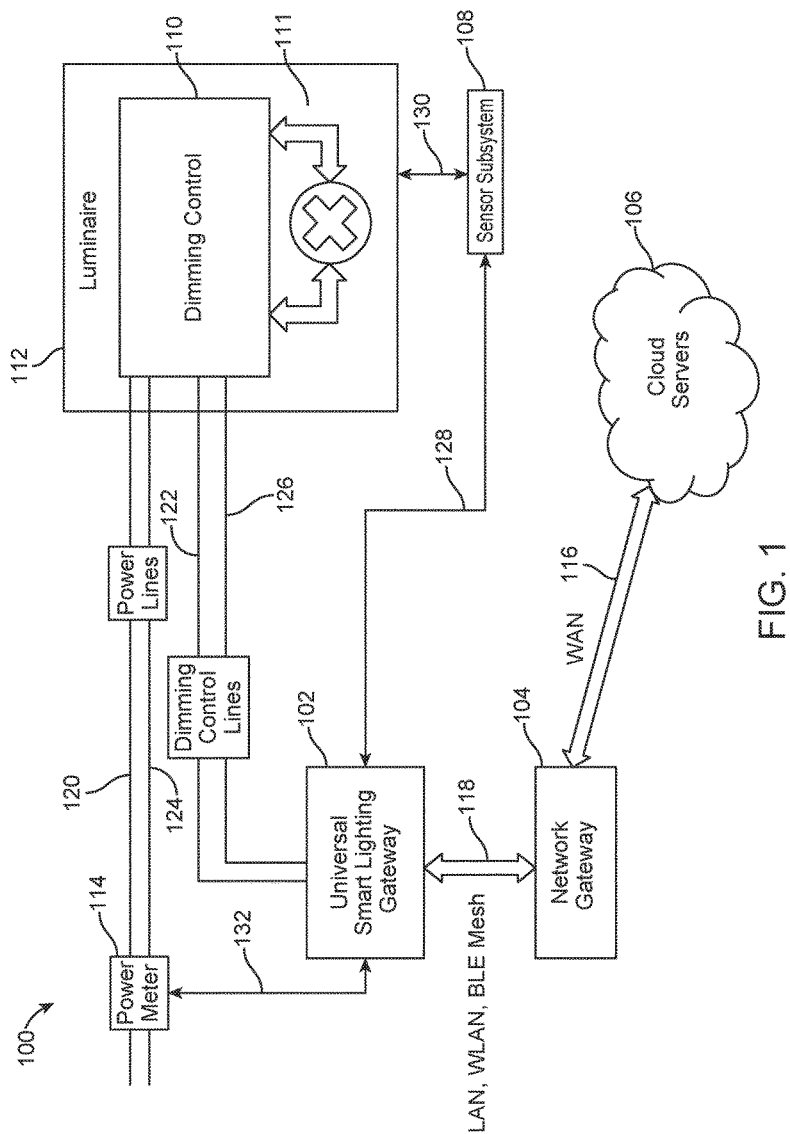
FIG. 1 is a high-level diagram of a system, according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used where possible, to designate like elements common to the figures.

DETAILED DESCRIPTION

Embodiments of the present disclosure relates to a system and method for controlling lighting devices, using multiple standard protocols. The system and method facilitate the exchange of information between a plurality of lighting devices and a self-discovery gateway. Additionally, they provide dimming control, and facilitate ease of system integration associated with the vast size of required system, as well as ease of use and installation of such systems.

Embodiments of the present disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts an illustrative embodiment of a system 100. The system 100 may also be referred to as a scenario/an environment. According to an aspect, the system 100 includes at least one protocol agnostic Universal Smart Lighting Gateway (USLG) 102, at least one of a plurality of luminaires 112 and a plurality of LED's 111, and a dimming control 110. In an embodiment, the luminaire 112 is a system that may include a single luminaire or multiple luminaires connected with a single common interface to power lines 120, 124 and dimming control lines 122, 126. According to an aspect, a power meter 114 is connected electrically between the USLG 102 and the luminaire 112 and is connected electrically to the luminaire 112 via the power lines 120, 124. The power meter 114 may be connected to the USLG 102 via the power meter interface 132. The power meter 114 connections are described in further detail hereinbelow, with reference to FIGS. 2 and 9.

Figure 3:
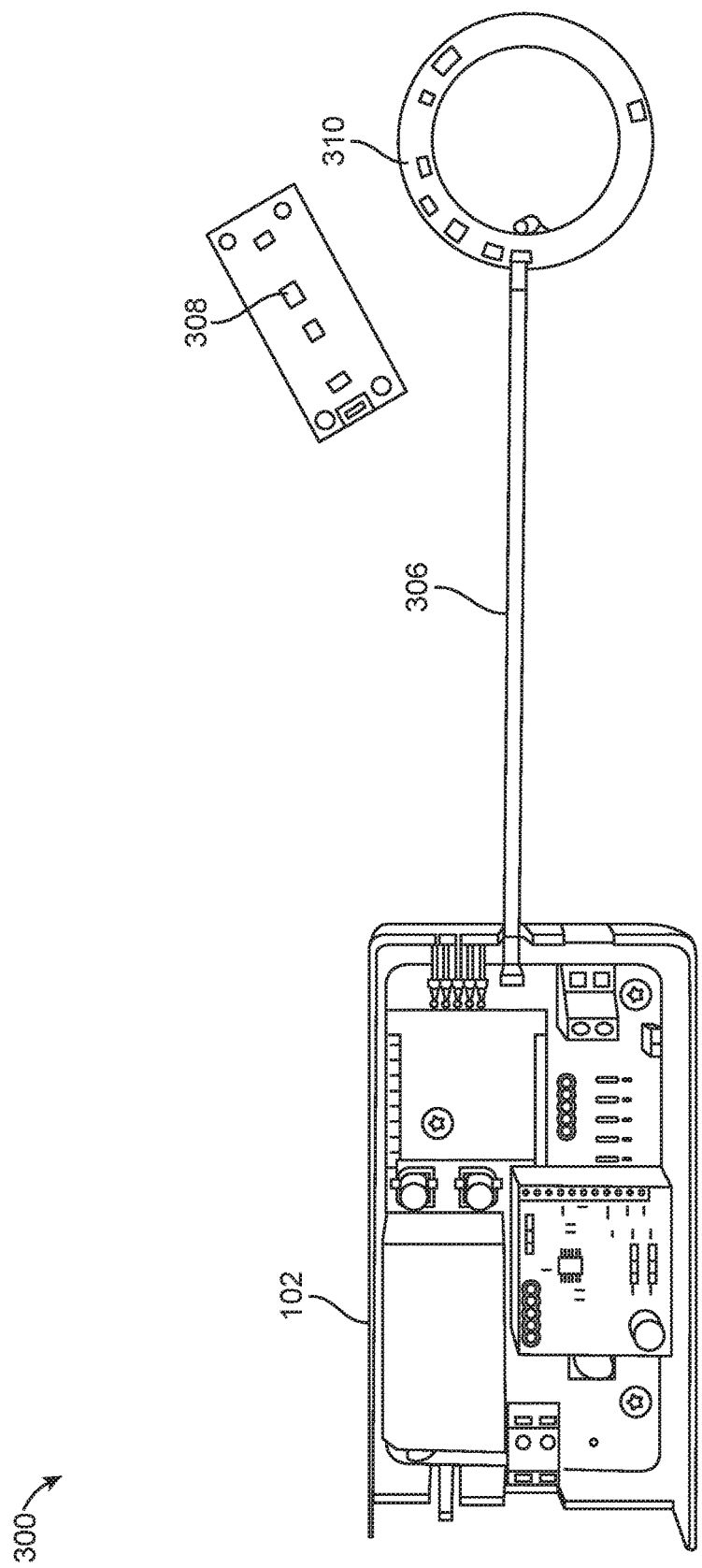
FIG. 3 is a perspective view of a system, illustrating a sensor connection to a luminaire, according to an aspect.

As illustrated in FIG. 1 and according to an aspect, the system 100 includes a sensor subsystem 108 that connects via connection 130 to the luminaire 112 on one side and to the USLG 102 via a sensor interface 128 on the other side. According to an aspect, the connection 130 to the luminaire 112 is physical and is not limited to a specific location. The location of the sensor subsystem 108 may be different for various types of sensors that are to be positioned. As seen in FIG. 3, for instance, physical sensor interfaces and connections may include the sensor interface 128 connected to the USLG 102. According to an aspect and with reference again to FIG. 1, the system 100 includes a backhaul interface 118 connected to the USLG 102 and a network gateway 104. The backhaul interface 118 may be wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is Mesh BLE. According to an aspect, the USLG 102 is connected with the network gateway 104, which resides between the local networks to a wide area network (WAN) 116. In an embodiment, the WAN 116 connects the USLG 102 to cloud computers/servers 106 for operational and management interfaces.

Figure 2:
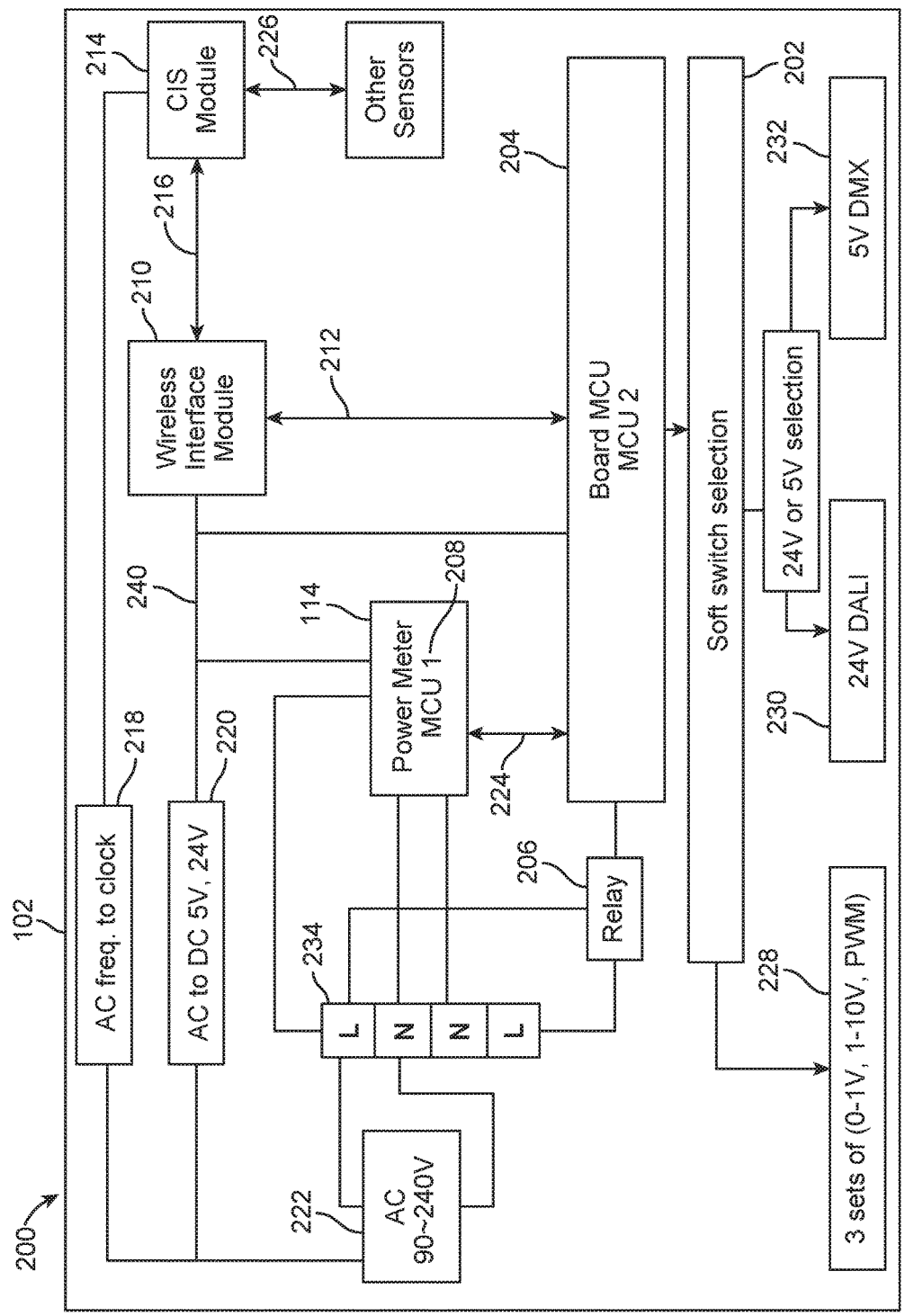
FIG. 2 is a diagram of a system, illustrating a power meter connection, according to an embodiment.

FIG. 2 depicts the USLG 102 in further detail. According to an aspect, a soft switch 202 to select between different electrical dimming interfaces is provided. The soft switch 202 may be actively used to search for the correct protocol between the USLG 102 and the luminaire 112 (not shown in this figure). The luminaire 112 may be a dimming luminaire 112. According to an aspect, protocol modules 228, 230, and 232 are the software implementation of the dimming interfaces that reside in the USLG 102. In an embodiment, the supported dimming protocol include several sets of protocols, such as, for example, 0V-10V, 1V-10V, PWM 228, protocols over 0V-10V and/or 1V to 10V, a 24V DALI 230 protocol, and a 5V DMX 232 protocol. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit 1 e.g., MCU-1 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (see, for example, FIG. 1). In an embodiment, the WIM 210 is implemented as Bluetooth Low Power (BLE) device that uses the Mesh BLE protocol to connect with other devices, as well as having the SPI bus 212 and an Inter-Integrated Circuit Two-Wire Serial Interface bus (TWSI) 216. The WIM 210 is connected to the Camera Interface System (CIS) module 214, which may be, for instance, an environmental sensor and a Red, Green, Blue (RGB) sensor combination device. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2, and according to an aspect, provides the physical electrical line connections.

Figure 2A:
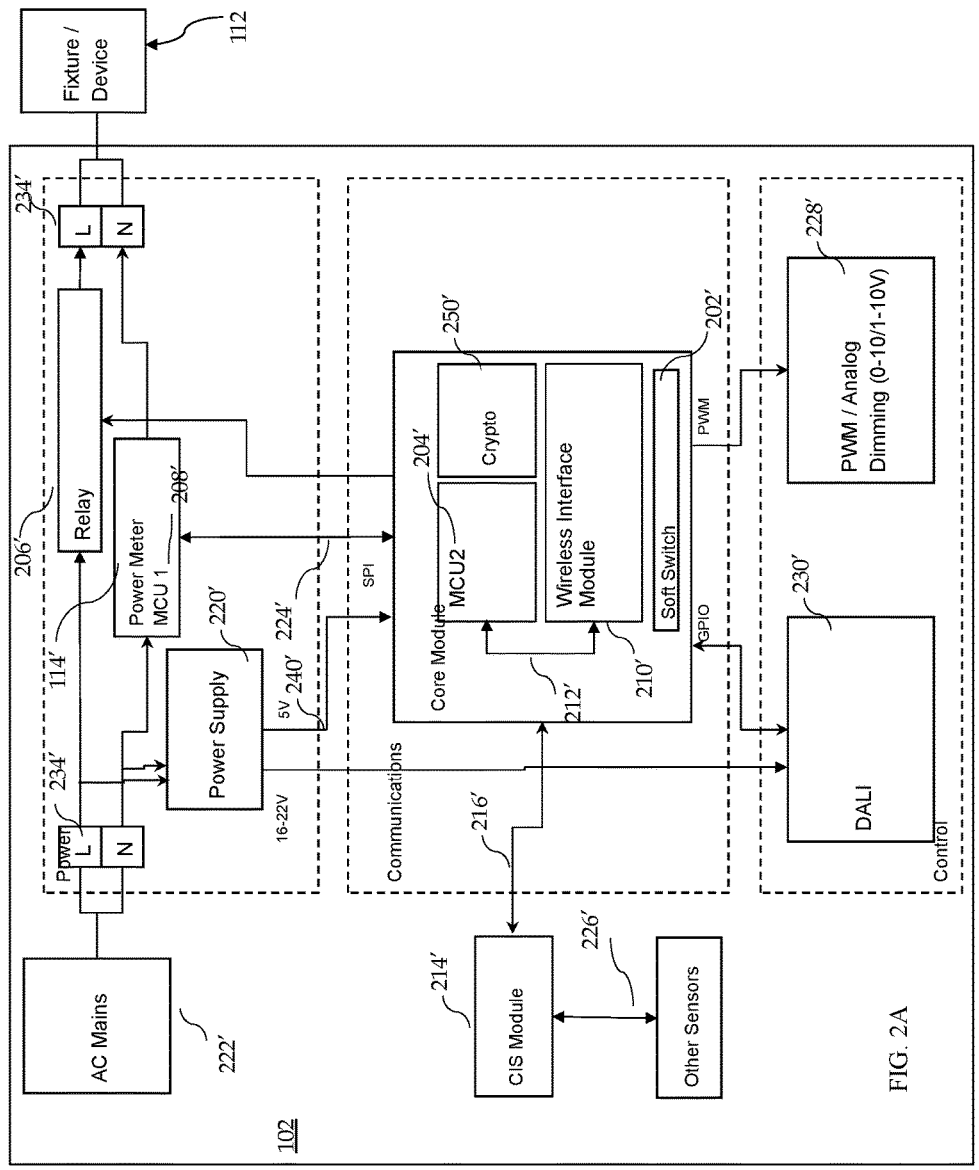
FIG. 2A is a diagram of a system, illustrating an alternate embodiment of the Universal Smart Lighting Gateway.

FIG. 2A depicts the USLG 102 demonstrating an alternative layout and additional detail. According to an aspect, a soft switch 202' to select between different electrical dimming interfaces is provided. The soft switch 202' may be actively used to search for the correct protocol between the USLG 102 and the luminaire 112. The luminaire 112 may be a dimming luminaire 112. According to an aspect, protocol modules 228', and 230' are the software implementation of the dimming interfaces that reside in the USLG 102. In an embodiment, the supported dimming protocol include several sets of protocols, such as, for example, 0V-10V, 1V-10V, PWN 228', protocols over 0V-10V and/or 1V to 10V, a 24V DALI 230' protocol. The protocols may each include algorithms, which may be implemented in a Micro Controller Unit 2 (MCU-2) 204'. According to an aspect, the MCU-2 204' is powered by an AC to DC 5V, 24V power module 220' via a power line connection 240'. MCU-2 204' may also be connected to a power meter 114' via a Micro Controller Unit 1 (e.g., MCU-1 and a Universal Asynchronous Receiver/Transmitter (UART) 224'. According to an aspect, MCU-2 204' is also connected to a Relay 206'. MCU-2 204' may also be connected to a Wireless Interface Module (WIM) 210' via a Serial Peripheral Interface (SPI) bus 212'. In an embodiment, the MCU-2 204' also controls the Relay 206', which may be designed to cut off/block the current to the luminaire 112 upon a decision by the MCU-2 204'. The power cutoff can be used to disconnect power from the controlled luminaire subsystem (see, for example, FIG. 1). In an embodiment, the WIM 210' is implemented as Bluetooth Low Power (BLE) device that uses the Mesh BLE protocol to connect with other devices, as well as having the SPI bus 212' and an Inter-Integrated Circuit Two-Wire Serial Interface bus (TWSI) 216'. The WIM 210' is connected to the Camera Interface System (CIS) module 214', which may be, for instance, an environmental sensor and a Red, Green, Blue (RGB) sensor combination device. The CIS module 214' can be extended via a second TWSI bus 226' with other sensor modules. The WIM 210' may require power, which is typically received via the AC to DC 5V, 24V power module 220' via the power interface line 240'. According to an aspect, an AC Power 90V-240V power module 222' is relayed to the MCU-2 204' via a Line Control (LN) 234', and relayed from the MCU-2 204' to the soft switch 202' for power selection for the dimming protocol interfaces. The AC Power module 222' may also be relayed to the power meter 114' via the LN 234', which measures all power delivered to the luminaire 112. The LN 234' illustrated in FIG. 2A, and according to an aspect, provides the physical electrical line connections. In addition to FIG. 2, in FIG. 2A there is an added crypto device 250' which is used to encrypt and decrypt messages sent over the WIM 210' interface. In other words, the crypto device 250' is configured for encoding the communication between the at least one cloud server and the Universal Smart Lighting Gateway According to an aspect the luminaire 112 may include a Bluetooth device or a beacon or an RFid device that can be read by the USLG 102. The information can include the dimming protocol supported by this luminaire. This information can be relayed by the USLG 102 to a server of a cloud server via its WIN interface. In other aspects, the USLG and/or the remote server can run algorithms to discover the dimming protocol and to identify the luminaire and its capabilities. Some of these methods are described here as an embodiment.

According to an aspect, and as illustrated in FIG. 3, the system 300 may include one or more sensors 308, 310, typically configured as CIS modules, connected to the USLG 102. FIG. 3 illustrates an embodiment that includes at least one of a first CIS module 308 and a second CIS module 310. (Only one connection is actually depicted, but it would be understood by one of ordinary skill in the art that one or both of the sensors 308, 310 can be connected to the USLG 102.) According to an aspect, the CIS modules 308, 310 may include a physical interface 306 with the USLG 102 via a TWSI connection that uses a 6 or 8 pin FPC cable and connector. The CIS modules 308, 310 may be physically connected at any desired position on the luminaire 112 (not shown). According to an aspect, the CIS module 308 is a linear module that can be adopted to fit on luminaires 112/devices that require a linear fitting. In an embodiment, the CIS module 310 is circular, and may be designed to fit circular-shaped luminaires 112.

In an embodiment, each of the CIS 308 and CIS 310 sensors include at least two sets of sensors (not shown). A first set of sensors (e.g., "environment sensors") may be dedicated to environment sensing, and may be arranged such that it faces away from and/or extends in a downwardly fashion, from the luminaire 112. According to an aspect, a second set of sensors or a single sensor (e.g., a "color sensor"/"RGB sensor") is arranged such that it faces the luminaire 112 directly. The first set is named the environment sensor and the second set is named the RGB sensor. The combination of the two sets of sensors, namely the environment sensor and the RGB sensor, may be combined into a single ASIC or may be arranged as a set of separate devices. According to an aspect, the first and second set of sensors of the CIS 308 and CIS 310 modules may also connect with the gateway. Both sets of sensors may provide real time measurements and assessments to the gateway. In response to the measurements and assessments provided, the gateway may control the dimming device and change the dimming level and a color temperature and RGB/RGBW (Red Green Blue Warm White) color, in devices that allow for color temperature and RGB/RGBW color control.

According to an aspect, the system 100 includes the RGB sensor directly facing the luminaires 112 (not shown). The RGB sensor may measure both the RGB content of a light source and the color/RGB intensity of the light source. According to an aspect, the RGB sensor or combination of sensors is configured to measure multiple channels as they directly face the luminaires 112.

Figure 4:
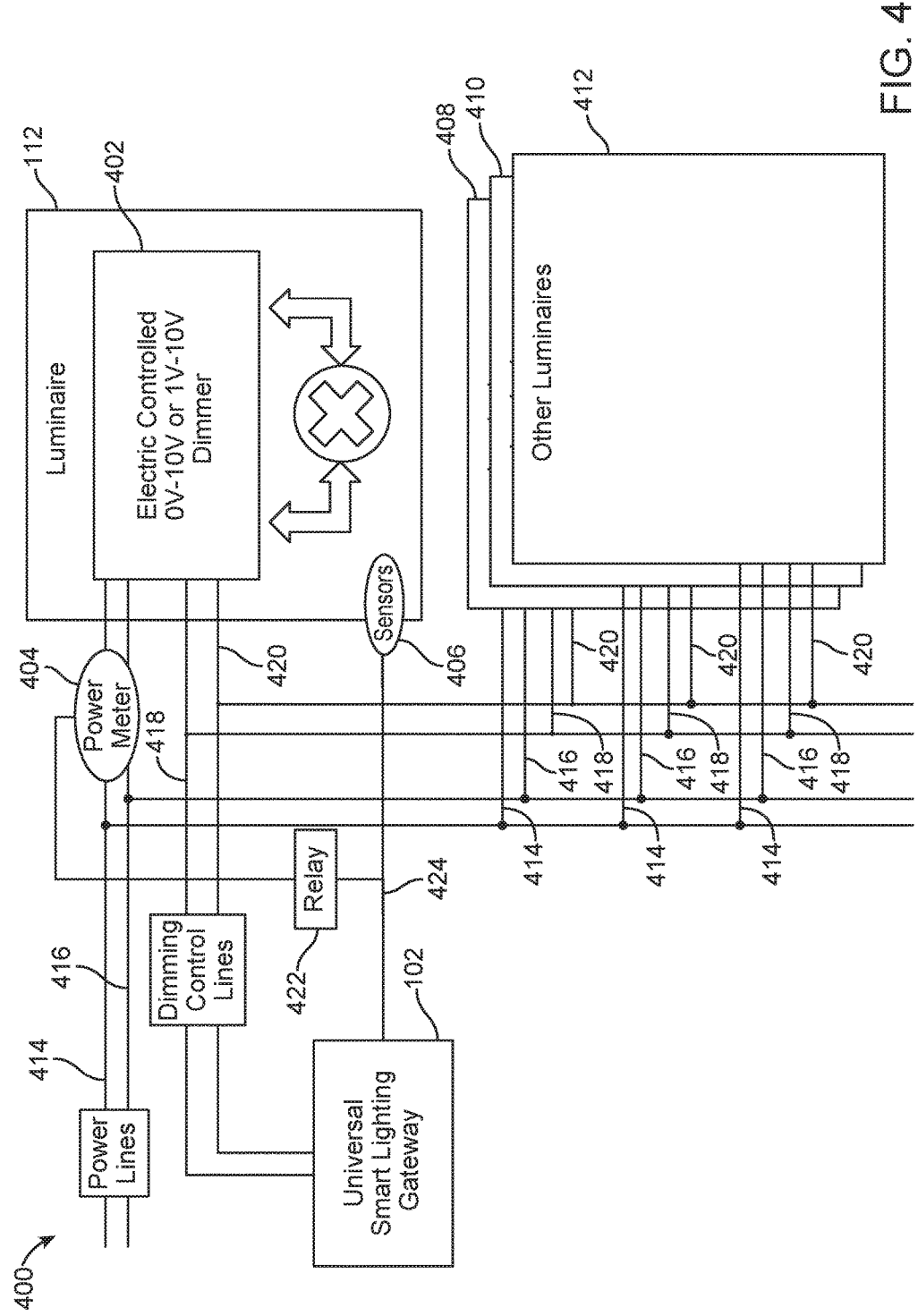
FIG. 4 is a diagram of a system, illustrating an analog interface including a 0V-10V and a 1V-10V connection to a dimming device, according to an embodiment.

The environment sensor may be a low resolution imaging sensor, such as an array of sensors combined into a low resolution imaging device, or a single ASIC that is an imaging sensor. According to an aspect, the environment sensor measures environmental parameters and is/are facing away from the luminaries 112. The environment sensor be arranged to monitor the environment of the light source. According to an aspect, the environment sensor includes at least three different types of sensors, such as, a low-resolution image sensor, an ambient light sensor, and a temperature sensor. Without limitation, this disclosure refers to the three sensors included in the environment sensor as "environment sensor". In an embodiment, the environment sensor includes several environmental sensors. In other words, the environment sensor may include less or more sensors than described herein. Embodiments in accordance with the present disclosure can use other sensors and more types of sensors to sense the environment. According to an aspect, the environment sensor is a single sensor ASIC. To be sure, the environment sensor can be any sensor that is capable of collecting enough information to measure the environment, including ambient light and temperature FIG. 4 illustrates an embodiment and a configuration 400 of a system 100, in which the USLG 102 controls an analog 1-1 interface with the luminaire 112. According to an aspect, the luminaire 112 is connected to multiple other luminaires 408, 410, 412 in parallel, such that any change in the input control impacts all the parallel luminaires 408, 410, 412 in the same way. While four luminaires 112, 408, 410, 412 are depicted for illustrative purposes, it will be understood by one of ordinary skill in the art that the system 100 works well for one or more, even many more than, four luminaires. In embodiments where the 0V-10V and 1V-10V are non-addressable analog protocols, parallel installed luminaires 408, 410, 412 must be using the same dimming interface. All the luminaires 112, 408, 410, 412 in this configuration may be powered via the same power interface, for instance, power meter 404 and power lines 414 and 416. As illustrated in FIG. 4, dimming control is provided via the dimming control lines 418, 420. According to an aspect, the luminaire 112 includes a dimming control box Electric Controlled Dimmer 402 that is controlled via a change in voltage over the input dimming control lines 418, 420, and provides the power directly to the LED/lighting device. According to an aspect, the gateway 102 is capable of communicating and handling a plurality of dimming protocols via the dimming control device 402. The protocols include, but are not limited to, 0V-10V, 1V-10V, DALI and DMX, and the like. According to an aspect, both digital and analog protocols and interfaces are included. Embodiments in accordance with the present disclosure do not limit the type of hardware/wire/bus interfaces between the gateway 102 and the dimming device 402, e.g., the number of wires, the type of wires or bus connectors. The connections used may be as simple as analog interface control wires and/or electrical/digital bus connectors of any kind. The dimming interface is tagged as ("dimming interface").

Embodiments in accordance with the present disclosure provide the power meter 404 that is connected to the input line of the luminaire 112 in such a way that it can measure the electrical power drawn by the luminaire at any given moment, in real-time ("power meter"). This power meter 404 may be connected to the gateway to provide real-time power measurements correlated 1-1 to the luminaire power drawn at any given moment. The interface between the gateway 102 and the power meter 404 can be a UART 424 or other communication interfaces ("power meter interface"). The interface between the power meter device 404 and the luminaire 112 depends on the type of power meter used. Since this is prior art and a well-known technology, a person of ordinary skill in the art will appreciate that knowhow associated with power meter connections.

As illustrated in FIG. 4, the USLG 102 may change the voltage over the dimming control lines 418, 420 between 0V-10V and 1V-10V to control the dimming level. The power meter 404 and the other sensors 406, such as the environmental and RGB sensors, may be arranged so that there is one power meter 404 and one other sensor 406 per luminaire 112, and are all connected to the USLG 102. The USLG 102 may allow for a plurality of sensors 406 and power meters 114 in order to monitor the plurality of luminaires 112, 408, 410, 412 connected in this fashion. In the general case of analog protocols such as 0V-10V and 1V-10V, devices are not individually addressable, thus there is no hard need to connect the power meter 404 to each luminaire. In an embodiment, a set of power meter 404 and sensor 406 pairs are provided per luminaire 112, 508, 510, 512. According to an aspect, the relay 422 illustrated in FIG. 4 demonstrates the ability to turn off the power altogether in cases were the 1V-10V dimming protocol is present and the user wishes to turn the dimming to 100%, e.g., OFF. The 1V-10V protocol may be limited in its ability to power OFF. According to an aspect, at protocol, which is the lowest setting available, there may still be about 5% lux. Therefore, the USLG 102 can use the relay 422 controls to turn the power completely OFF.

Figure 5:
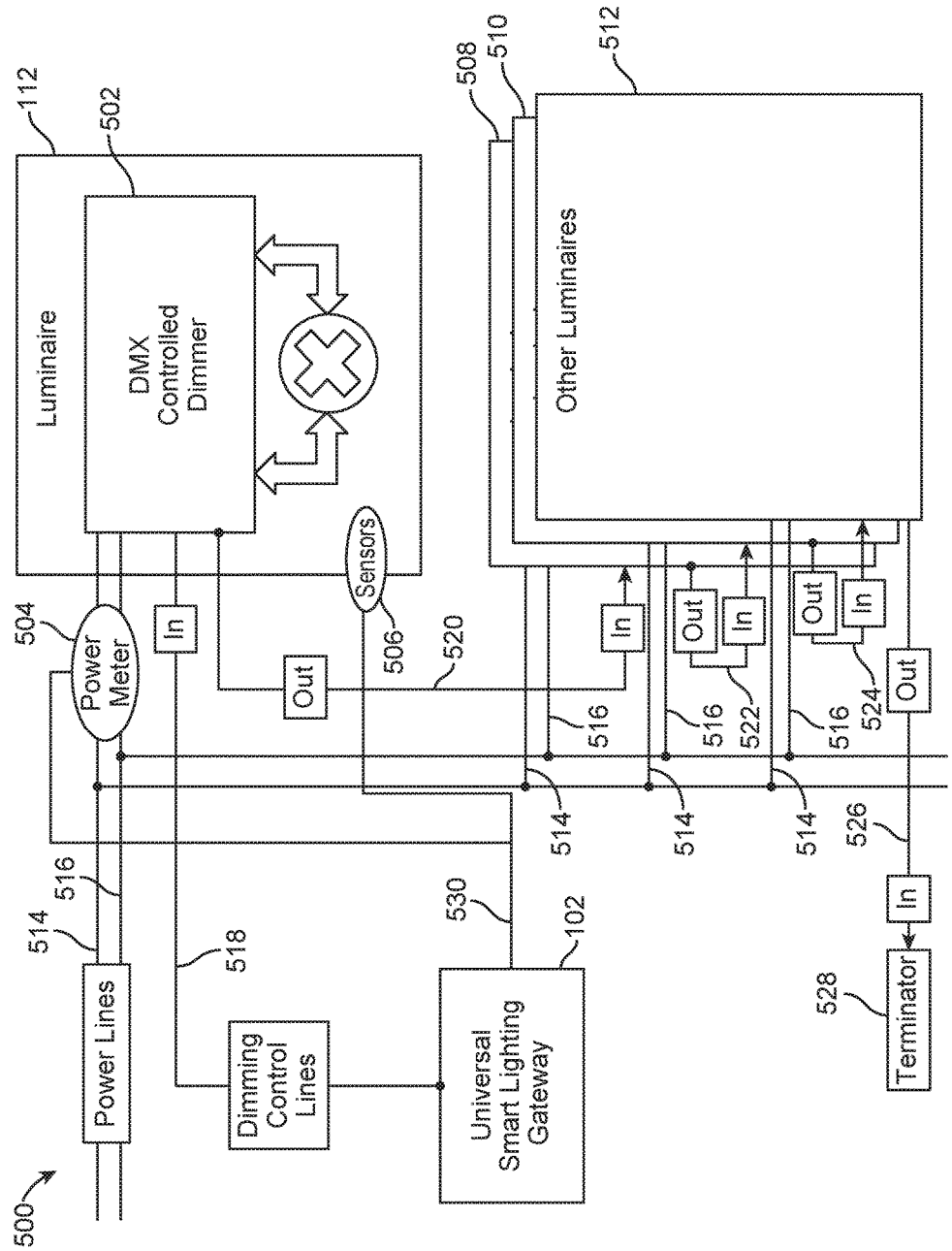
FIG. 5 is a diagram of a system, illustrating a DMX connection to a dimming device, according to an embodiment.

FIG. 5 depicts a configuration 500 in which the USLG 102 is controlling a DMX interface with the luminaire 112. The luminaire 112 may be connected to multiple other luminaires 508, 510, 512 in parallel for the input power lines 514, 516. A DMX dimming control system 502 provides a digital control protocol that allows individual addressable luminaires. According to an aspect, the dimming control line is getting IN 518 and OUT 520 of the luminaire 112. The OUT 520 interface can be another IN interface into another luminaire 508 or go into a termination node/terminator 528 via line 526. This last connectivity 520 is repeated for every luminaire 508, 510, 512 in the chain. Each luminaire node that is chained in this fashion may be addressable within the DMX protocol. The DMX protocol control 502 in the luminaire 112 box may be implemented in partial or full, according to standard protocols. According to an aspect, all the luminaires 112, 508, 510, 512 in this configuration are powered via the same power interface. In an embodiment, the dimming control is via the dimming control lines 518, 520. According to an aspect, the dimming protocol of all luminaires 112, 508, 510, 512 in this chain must be the same, e.g., DMX, which may be based on the standard protocols and is not imposed by the USLG 102. In this parallel arrangement, the power meter 504 and the other sensors 506, such as, for example, the environmental sensors and the RGB sensors, may all be arranged such that there is one per luminaire 112, 508, 510, 512 and are all connected to the USLG 102. The USLG 102 allows for a plurality of sensors and power meters in order to monitor the plurality of luminaires connected in this fashion. In the case of a DMX dimming control system 502, the individuality of addressable luminaires 112, 508, 510, 512 may require at least one set of power meter 504 and sensors 506 connected to each luminaire 112, 508, 510, 512. According to an aspect, the power meter 504 is connected to the power input lines 514, 516 and the sensors 506 are attached to the luminaire 112. The power meter 504 is connected to the gateway 102 via interface 530.

Figure 6:
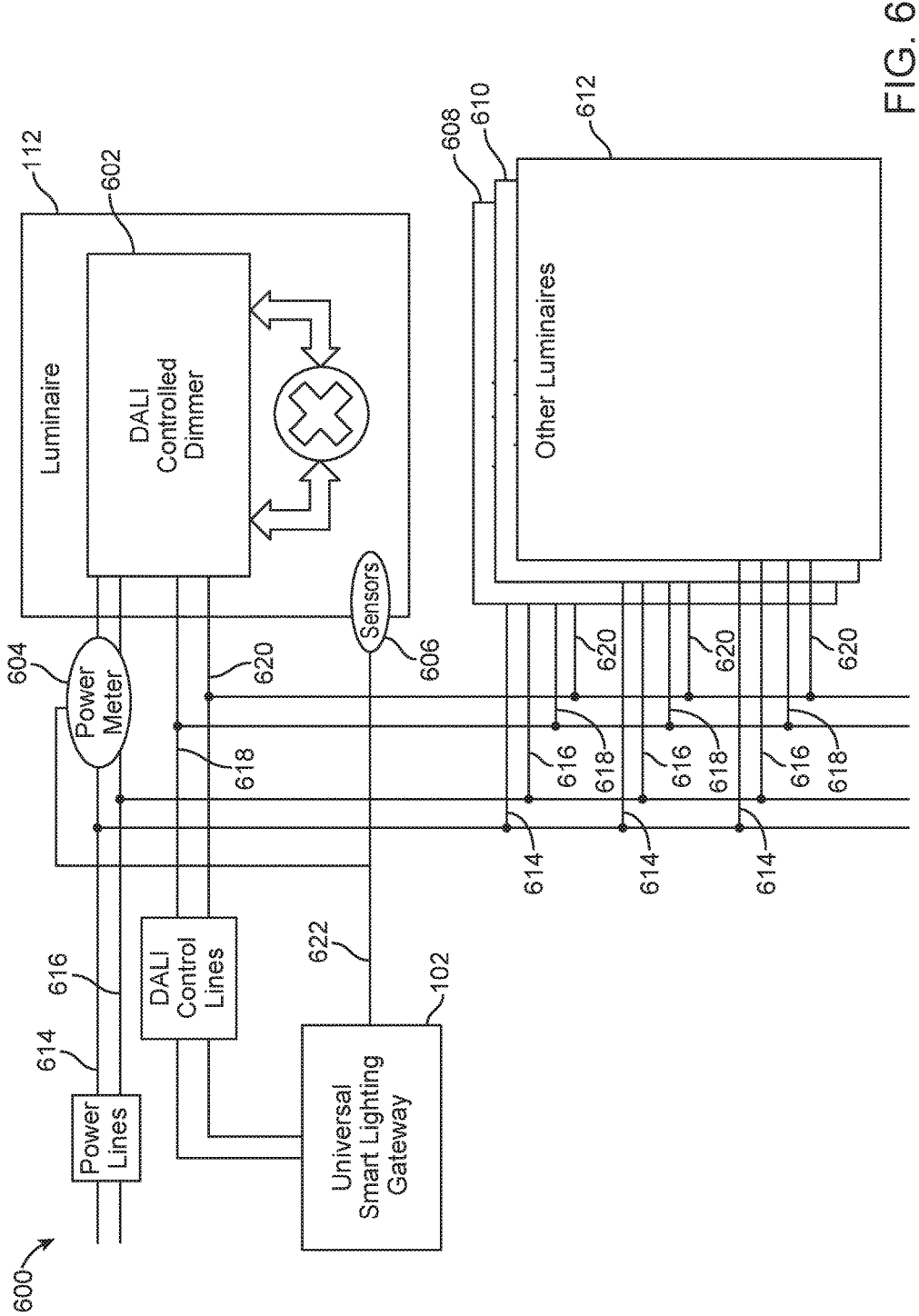
FIG. 6 is a diagram of a system, illustrating a DALI connection to a dimming device, according to an embodiment.

FIG. 6 illustrates an embodiment and a configuration 600 in which the USLG 102 is arranged to control a DALI interface 602 with the luminaire 112. The luminaire 112 may be connected to multiple other luminaires 608, 610, 612 in parallel for the input power lines 614, 616, as well as for the DALI control lines 618, 620. DALI is a digital control protocol that allows individual addressable luminaires. As illustrated in FIG. 5, the dimming control lines 618, 620 are connected in parallel. According to an aspect, the DALI protocol does not require a termination node 528 (described hereinabove, and illustrated in FIG. 5). In an embodiment, each luminaire 112 that is chained in this fashion is addressable within the DALI protocol. The DALI protocol control 502 in the luminaire 112 box may be implemented in partial or full, according to the standard protocol. All the luminaires 112, 608, 610, 612 in this architecture may be powered via the same power interface. Since each of the luminaires 112, 608, 610, 612 are individually addressable, this individual addressability may allow for a scenario where each luminaire 112, 608, 610, 612 exhibits a different power level and a different dimming level. The dimming control may be provided via the dimming control lines 618, 620. According to an aspect, the dimming protocol of all luminaires 112, 608, 610, 612 in this chain must be the same. In an embodiment, the dimming protocol of all luminaires 112, 608, 610, 612 is the DALI protocol. According to an aspect, this requirement is due to the standard and is not imposed by the USLG 102. To be sure, the USLG 102 may allow for a plurality of sensors and a plurality of power meters in order to monitor the plurality of luminaires 112, 608, 610, 612 connected in this fashion. In the case of a DALI dimming control system 602, the individuality of addressable luminaires may require at least one set of a power meter 604 and sensors 606 connected to each luminaire 112, 608, 610, 612. According to an aspect, the power meter 604 is connected to the power input lines 614, 616 and the sensors 606 are attached to the luminaire 112.

Figure 7:
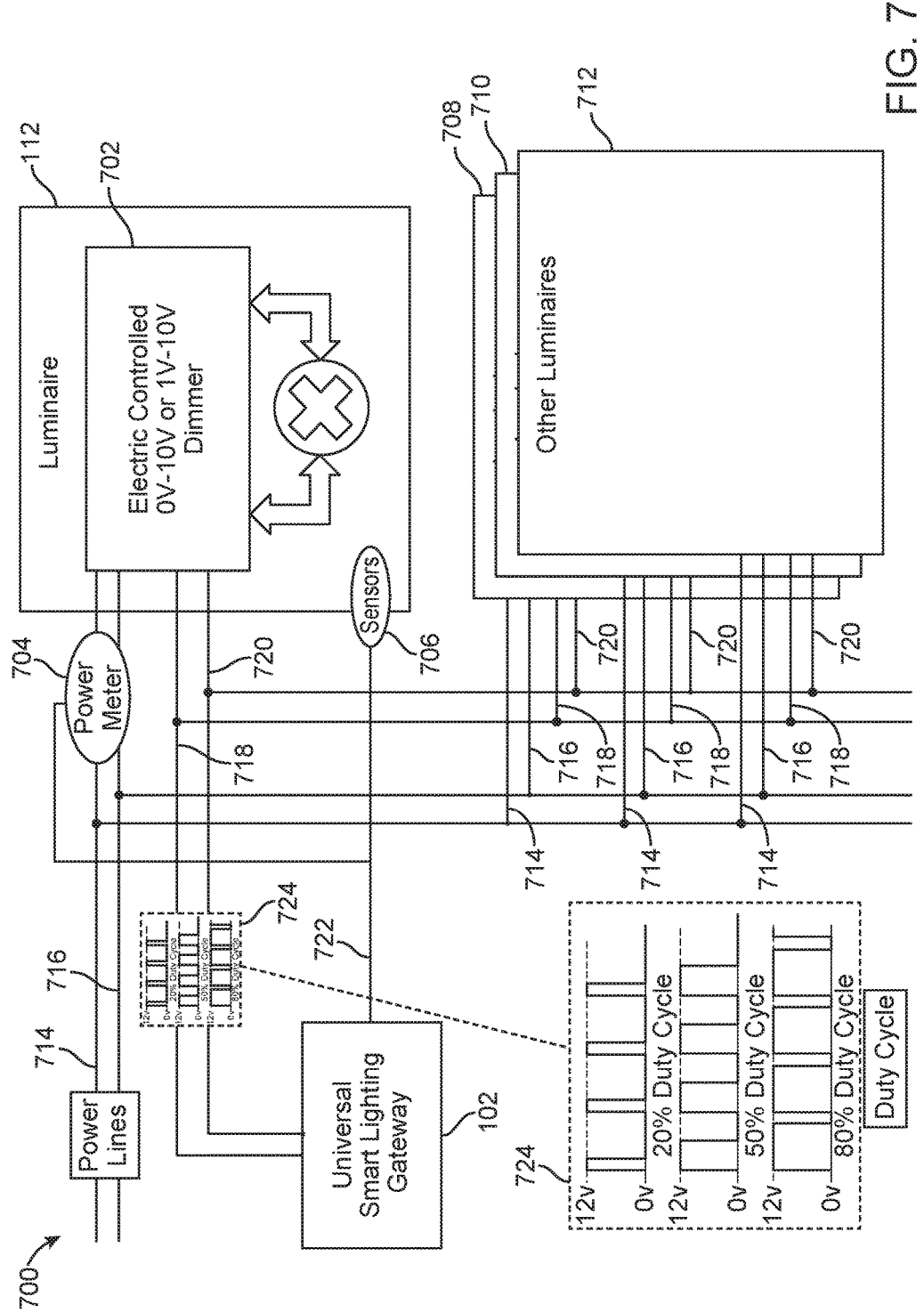
FIG. 7 is a diagram of a system, illustrating an analog interface with a luminaire that includes a PWM connection to a dimming device, according to an embodiment.

FIG. 7 illustrates an embodiment and a configuration 700 in which the USLG 102 controls analog 1-1 interface with the luminaire 112. The luminaire 112 may be connected to multiple other luminaires 708, 710, 712 in parallel, such that change in the input control impacts all the parallel luminaires 708, 710, 712 in the same way. According to an aspect, the 0V-10V and 1V-10V are non-addressable analog protocols, thus, the parallel installed luminaires 708, 710, 712 may use the same dimming interface. According to an aspect, all the luminaires 112, 708, 710, 712 in this architecture may be powered via the same power interface. According to an aspect, the dimming control is provided via the dimming control lines 718, 720. The luminaire 112 may further include a dimming control box/an Electric Controlled Dimmer 702 that is controlled via change in voltage over the input dimming control lines 718, 720, and configured to provide the power directly to the LED/lighting device. In an embodiment, a Pulse Width Modulation (PWM) control is implemented on the ULSG 102, in which the dimming control lines 718, 720 1V-10V provide a pulsed control that is modulated over time, such that a duty cycle 724 changes accordingly to reflect the dimming percent (such as, for example, about 20%, about 50%, and about 80%) desired. Any known PWM dimming method may be utilized using devices available from multiple device manufacturers, which may enable this type of modulation over an analog dimming interface. According to an aspect, the USLG 102 changes the voltage over the dimming control lines 718, 720 between 0V-10V and 1V-10V using the PWM scheme to control the dimming level. The power meter 704 and the other sensors 706—environmental and RGB sensors—are one per luminaire and are all connected to the USLG 102. The USLG 102 allows for a plurality of sensors and power meters in order to monitor the plurality of luminaires 112, 708, 710, 712 connected in this fashion. In the general case of analog protocols such as 0V-10V and 1V-10V, devices are not individually addressable, thus there is no hard need to connect the power meter 704 per luminaire. One could connect a single power meter 704 on the common lines and use the discovery process to learn how many devices are in fact connected. The embodiment, though, is to have a set of power meter 704 and sensor 706 per luminaire.

Figure 8:
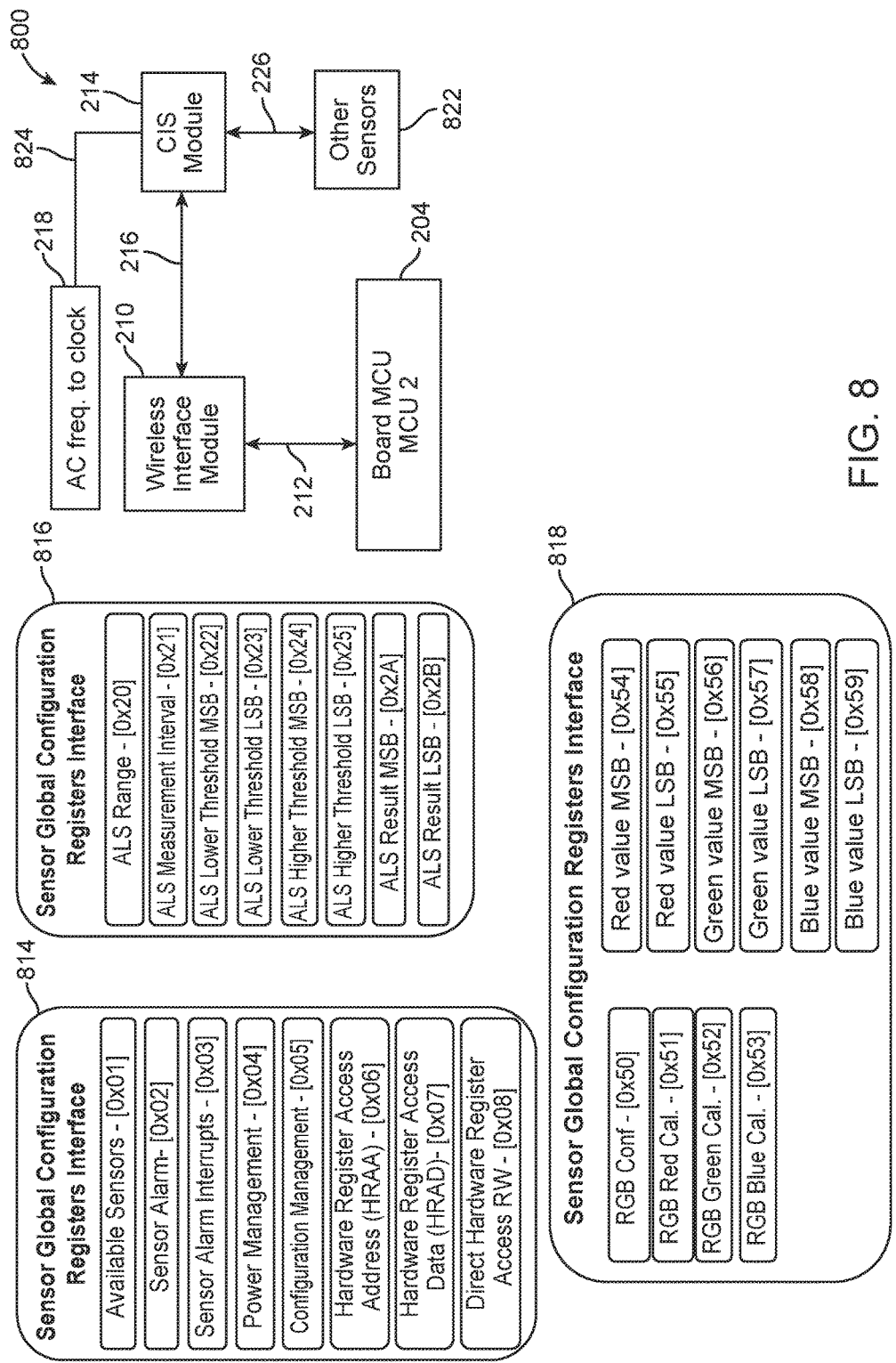
FIG. 8 is a diagram illustrating a type of information/data structure that is receivable by a sensor interface of a system, according to an embodiment.

FIG. 8 illustrates an embodiment of a sensor interface data structure 800. According to an aspect, the sensor interface is the TWSI 216 that allows the use of memory-mapped registers to communicate information between the WIM 210 and the CIS module 214. In turn, the WIM 210 may provide this information and receive directives from the Board MCU-MCU 2 204 via a SPI bus 212. Any person of ordinary skill in the art will appreciate that the sensor module interface 212 can be very rich and may be distinct for each of the particular sensor devices 800 used in various configurations. As illustrated in FIG. 8, and according to an aspect, the sensor devices 800 may include multiple registers associated with any/all of its functions. FIG. 8 depicts some of the features to exemplify the data structure. In an embodiment, the interface 216, 226 with the sensor device is an array of eight bit (8-bit) registers (see, for instance, Sensor Global Configuration Register Interfaces 814 and 816). Each may be mapped to a specific memory address on the WIM 210. In an embodiment, a plurality of interfaces 814, 816, 818 is provided to control the sensors 800. In the exemplary embodiment of FIG. 8, an example of a register, such as a Sensor Global Configuration Register Interface 814 is illustrated. The Sensor Global Configuration Register Interface 814 may be set as follows: the register in address 0x01 will turn on bits associated with available sensors on the module. If a sensor does not exist, its bit may be set to 0. Available sensors in this embodiment may be: Ambient Light Sensor ("ALS"), Motion detection based on PIR ("PIR"), RGB sensor ("RGB"), Motion detection and direction based on frame capture ("MOT"), LED Lumen sensor ("LL"), and Temperature sensor ("TEMP"). According to an aspect, the register address 0x02 is used as an alarm for the different sensors; e.g., one can set the value range so that when reached by the specific sensor the appropriate alarm bit in this register will turn to 1, or else it is 0. The register in address 0x03 may be used for resetting sensor alarms when this occurs. According to an aspect, the register in address 0x04 is used to power ON and/or OFF the entire sensors' system. The register in address 0x05 may be used for configuration management. Typical registers can be found in register addresses found in 0x06-0x08, as well as 0x20-0x28 and 0x50-0x59. These are merely examples, as one of ordinary skill in the art would understand—additional sensors would expand (or constrict) the registers.

Figure 9:
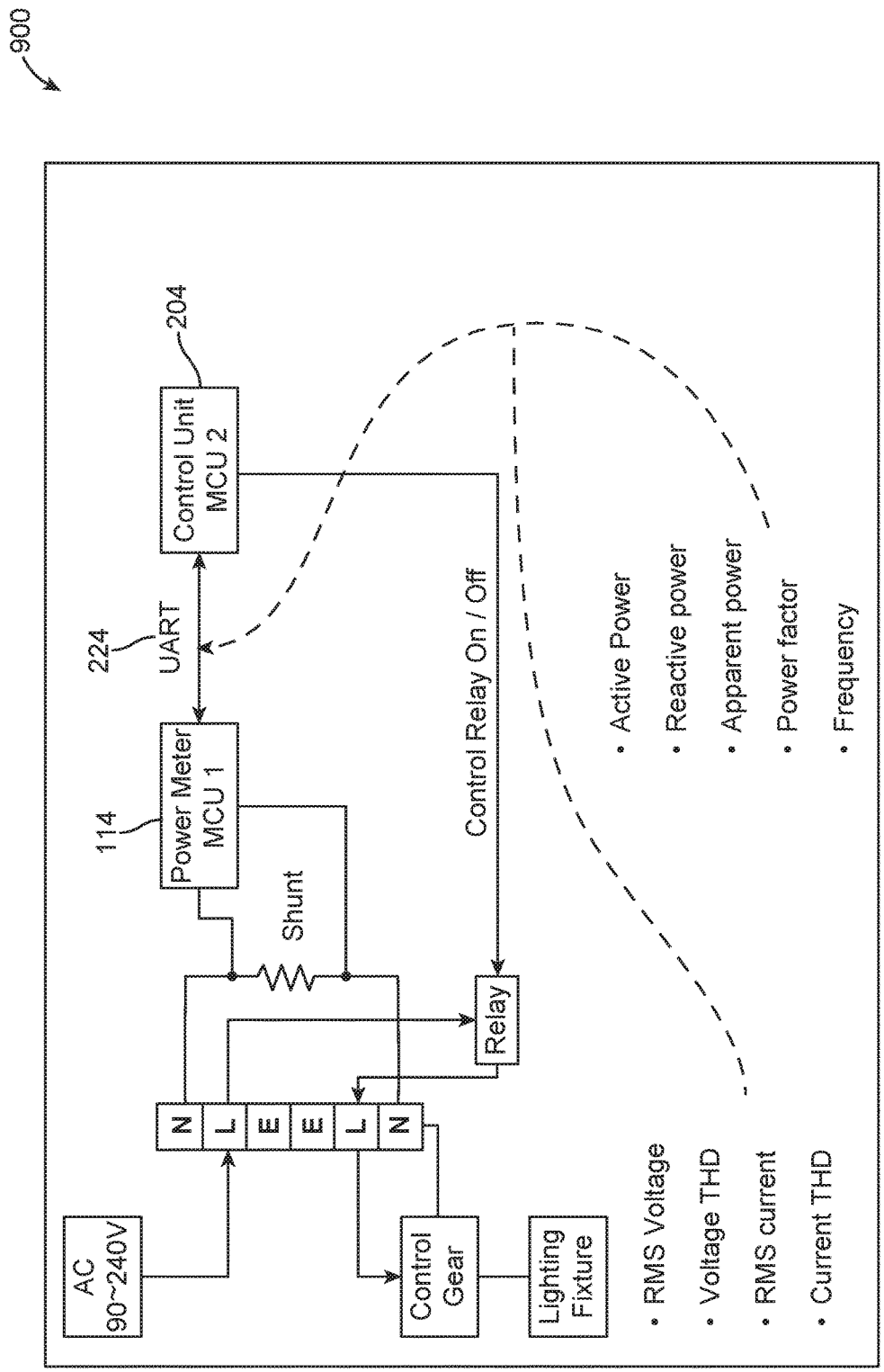
FIG. 9 is a diagram illustrating another type of information/data structure that is receivable over a power meter interface of a system, according to an embodiment.

FIG. 9 illustrates an embodiment 900 of the power meter 114 block diagram, which may be used in the system 100. Any person of ordinary skill in the art will appreciate that power meter 114 devices can be obtained from multiple sources. According to an aspect, the power meter 114 may be physically connected with and/or have physical connectivity within the USLG 102 (see, for example, FIG. 1). In one embodiment, the list of information that is communicated by the power meter 114 via the UART includes: RMS Voltage, Voltage THD, RMS current, Current THD, Active Power, Reactive power, Apparent power, Power factor, and Frequency. Various mixed signal microcontrollers 204, such as those sold by Texas Instruments® under the Manufacturer's Code "MSP430I2041" may be used by the system 100 and are able to communicate with the power meter 114.

Figure 10:
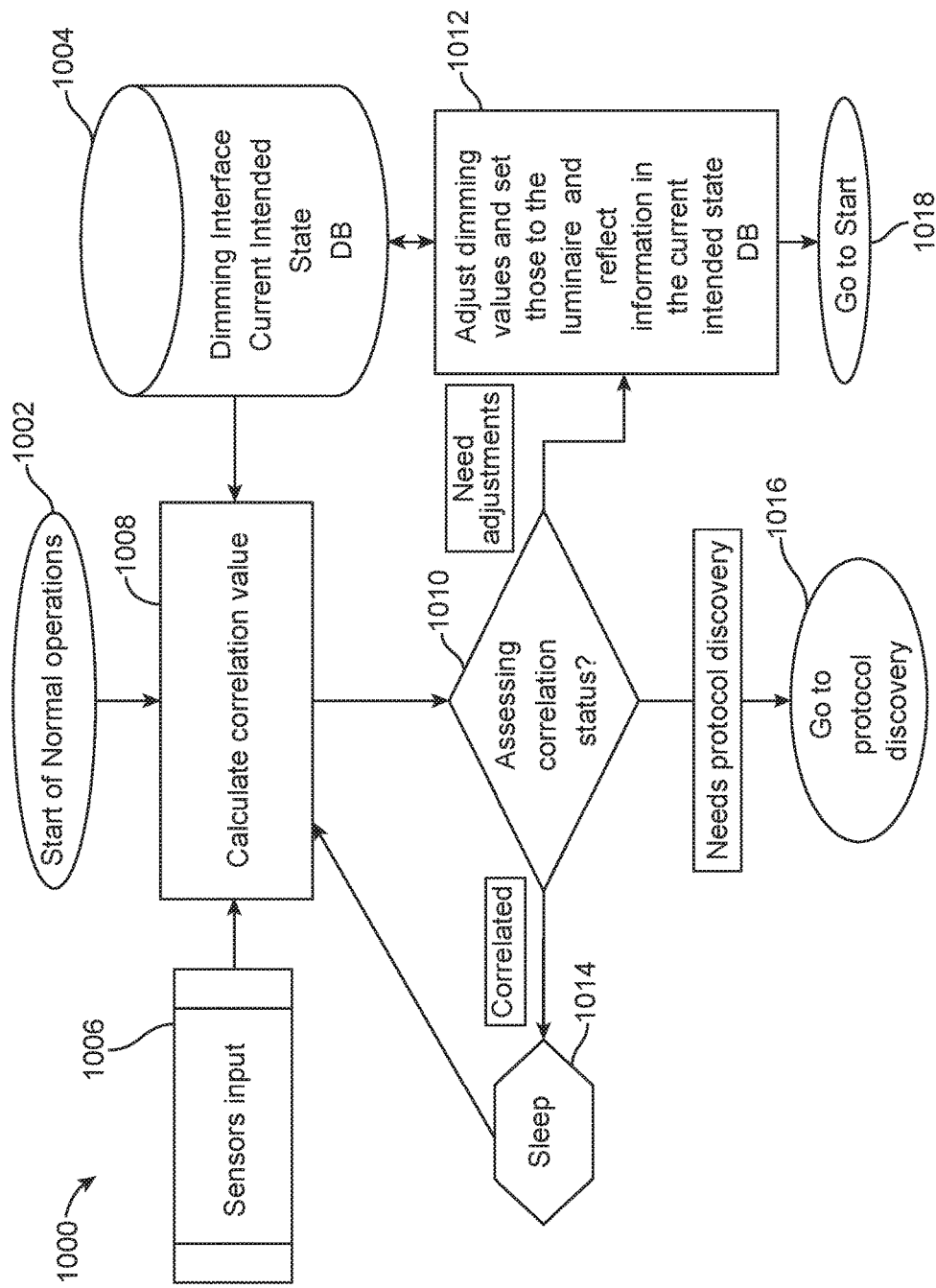
FIG. 10 is a flow chart illustrating a normal state operation of a system, in which current luminaire information is monitored and adjusted, according to an embodiment.

FIG. 10 illustrates an embodiment 1000 of normal operation of the USLG. According to an aspect, a normal operation cycle process is shown at 1002. At step 1004, the Dimming Interface Current Intended State Database (DB) may be initiated from within the USLG or via the backhaul of the USLG, e.g., from the outside. At step 1006, the associated sensors may provide different sensed values to the USLG. At step 1008, the USLG may compare this requested dimming state with existing readings and calculated correlation values. According to an aspect, at step 1010, the USLG reassesses the generated correlated values. In an embodiment, if the USLG determines that the values are properly correlated then the operation moves to step 1014 when the system goes to sleep. Alternatively, at step 1010, the USLG may determine that the generated correlated values need adjustment, then the operation moves to step 1012. According to an aspect, at step 1012, the USLG adjusts the dimming values, set those to the luminaires and reflect that information in the current intended state DB. At next step 1018, the system may go back to start. In the meantime, after step 1010, if the luminaire is far out of a simple adjustment range, then at step 1016, the USLG may initiate finding a new protocol interface or dimming state that can satisfy the designed/intended dimming state.

In an embodiment, in a normal operation cycle, the USLG may monitor the sensors input at step 1006 and the power meter inputs, and may compare these inputs to a desired state of the luminaire. This operation may be performed in a cycle that includes monitoring and sleeping for some nanoseconds before taking the next reading of the sensors input at step 1006 and the power meter input. The 'Dimming Interface Current Intended State DB' at step 1008 is a description of the current intended state being initiated from within the USLG or via the backhaul of the USLG, e.g., from the outside. The USLG may compare this requested dimming state with existing readings and calculated correlation values at step 1004. In most cases the current dimming state information being sensed and measured by the USLG does not need to change; e.g., in idle state, the requested dimming state and the sensor readings may be within the correlation boundaries.

In all cases, such as each normal operation cycle, the 'calculate correlation value' module at step 1008 may generate correlation information that needs to be reassessed. At step 1010, the results of the assessment can be that the USLG is currently correlated, thus it can sleep at step 14 and reassess the information later, or it may determine that there needs to be some adjustments at step 1012, or it may determine that a full protocol discovery at step 1016 needs to be executed.

At step 1012 the USLG uses the existing dimming protocol to go 'up' or 'down' or 'change color temperature', etc., of the luminaire. According to an aspect, the dimming protocol and reenter/go back to idle state, from which it will wake up and monitor the new states.

In the case where the luminaire is determined to be far out of simple adjustment range, the USLG will initiate finding the new protocol interface or the dimming state at step 1016, which can satisfy the designed/intended dimming state.

Figure 11:
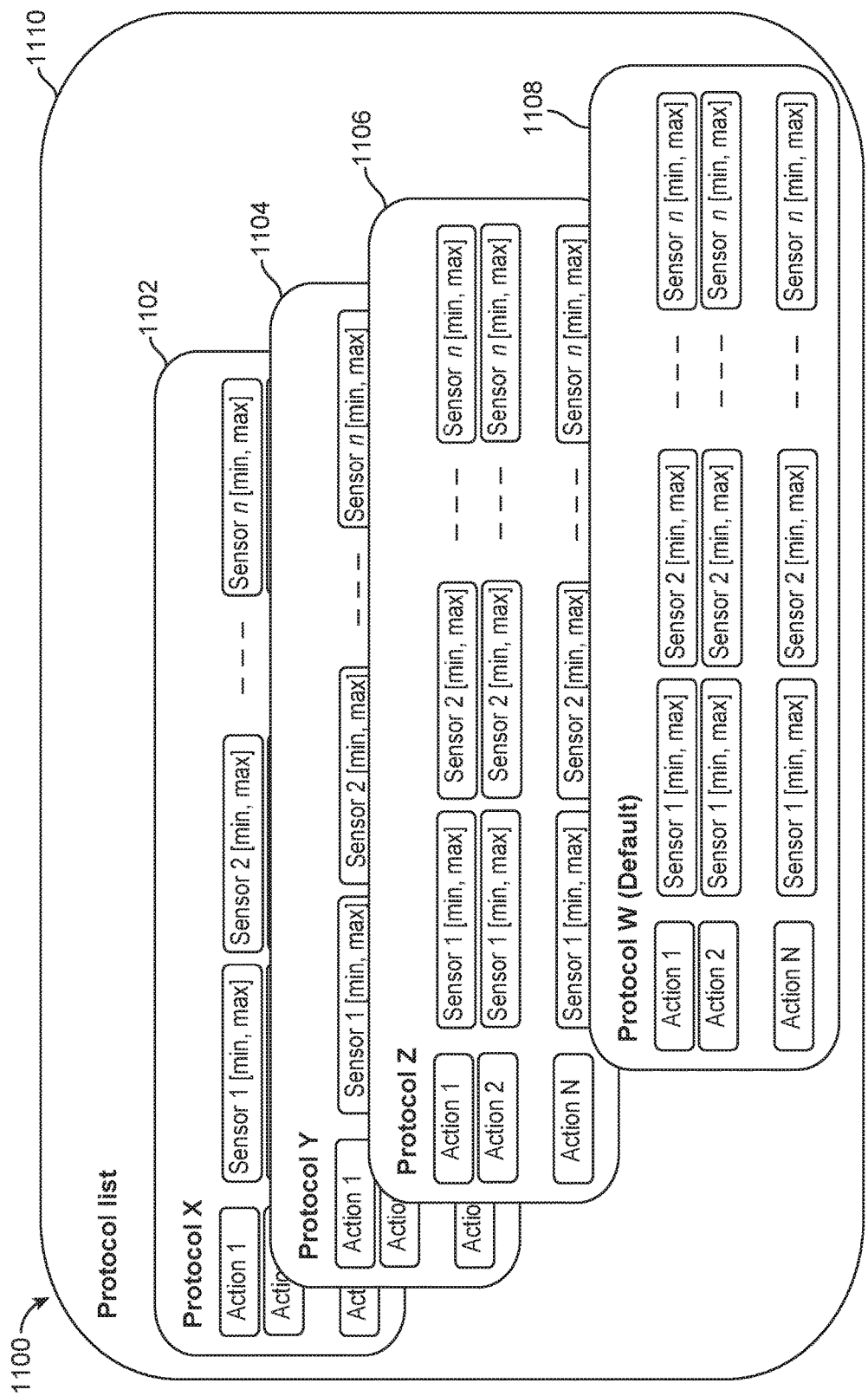
FIG. 11 is a diagram illustrating a list of protocols and their related actions and expected value range for sensor measurements of a system, according to an embodiment.

FIG. 11 illustrates an embodiment 1100 of a protocol list data structure 1110 for the USLG. The data structure 1110 may be designed such that it is easy to traverse the protocol options and pick the correct protocol during the discovery process. The protocol list includes N protocols, were N can be any number. In an embodiment, each protocol (X 1102, Y 1104, Z 1106 . . . W 1108) contains directives to the USLG to setup the specific protocol interface (e.g., power level, specific line connections, and other required information as dictated by the protocol standard interface). Further, each protocol may contain a set of directives/actions numbered 1-N. The discovery process may use these directives to take actions like sending a message or changing the voltage level over the dimming control lines. According to an aspect, each action in the list is associated with a list of sensor measurement ranges, one per sensor and per power meter. These measurement ranges may be compared with actual readings as part of the dimming protocol discovery process. In an embodiment, at least one of the protocols, without limitation, can be marked as a default protocol W 1108. According to an aspect, this is the protocol to which the USLG will default into when no other protocol is discovered.

Figure 12:
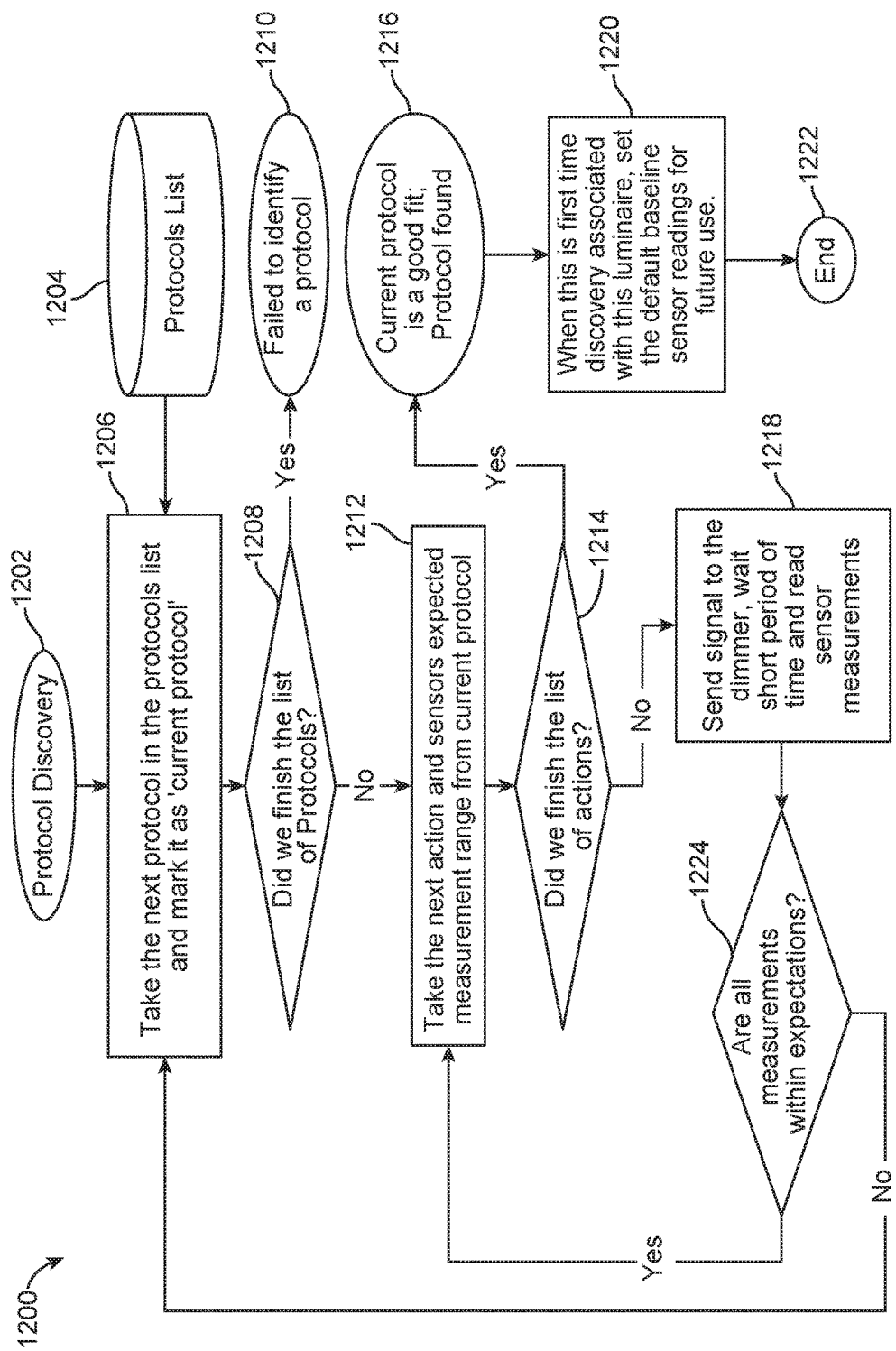
FIG. 12 is a flow chart illustrating a protocol discovery process of a system including a discovery algorithm, according to an embodiment.

FIG. 12 illustrates an embodiment 1200 of the protocol discovery process 1202. According to an aspect, at step 1204, the protocol is determined from a list of protocols, as seen, for instance, in FIG. 11. At step 1206, the process may include retrieving/taking/assuming a protocol from the list of protocols, and mark it as the "current protocol". The current protocol may include a dimming control protocol. At step 1208, the system may check if the entire list of protocols is finished. If the list is completed 'Yes', then the next step of operation goes to step 1210, which may indicate that there has been a failure to identify a protocol. In an embodiment, when a current protocol that has passed all of the verifications correctly is found, proper identification of the protocol and/or the identification process will be successfully achieved. If the list is not finished, 'No', then the next step of operation may go to step 1212. According to an aspect, at step 1212, the system activates the next action inside the protocol, and takes measurements via the sensors, based on a previously identified range. In other words, at step 1212, the system expects the measurements to be in specific ranges using the current protocol. In an embodiment, the method further includes receiving at least one real time sensing measurement from at least one sensor subsystem, and receiving at least one real time power measurement from at least one power meter. The USLG may utilize the at least one real time sensing measurement and the at least one real time power measurement to correlate between the at least one dimming control protocol, and between the plurality of luminaires. The sensor subsystem may be configured substantially as described hereinabove and illustrated in FIG. 3, and may include at least one of a color sensor and an environmental sensor. Each of the sensor subsytem and the power meter may be physically connected to the at least one USLG, and the real time sensing measurement may be received by the at least one USLG via at least one sensor interface while the real time power measurement is received by the at least one USLG via at least one power interface. According to an aspect, the USLG may be connected to the at least one power meter via a Universal Asynchronous Receiver/Transmitter interface. According to an aspect, the USLG may also be connected to at least one network gateway in a backhaul via at least one of a LAN, a WLAN, a WAN, and a Mesh BLE radio network. In an embodiment, at least one network gateway is connected to at least one cloud server via the WAN.

At step 1214, the system may check whether the entire list of actions has been finished/completed. If the actions are finished, 'Yes', then the next step of operation is step 1216, which may include determining that the current protocol is a good choice/fit for the system, and the protocol may be finalized. According to an aspect, at step 1220, after the protocol is found, the system saves the default baseline sensor readings for future use. In an embodiment, at step 1222 the process ends. According to an aspect, if the actions are not finished in step 1214, 'No', then the next step of operation may be step 1218 where the system sends signals to the dimmer, waits a short period of time and reads sensor measurements.

In an embodiment, step 1224 may follow step 1218. According to an aspect, at step 1224, the measurements, such as, for example, the real time sensing measurement and the real time power measurement, are taken to see if they are within expectations. If 'Yes', measurements are within expectations then the system moves back to step 1212 to select the next action in the protocol verification process. If 'No', such as, for instance, measurements are outside the normal range, the system may move back to step 1206, where it will pick a new protocol to check. The steps in the process may include the following: The protocol list at step 1206 includes a pointer to the 'next protocol' and marks it as current protocol at step 1204 in use with this device. If no protocol is the 'next protocol', the pointer may be pointing to an empty protocol indicating that the beginning of the list is next. The algorithm's first step is to advance the last protocol pointer to the next protocol in the list. If there are no protocols, e.g., after advancing through the end with an empty protocol, then there are no more protocols to check and the algorithm chooses the default protocol in the list, or simply exits with failure. In case the protocols list is not exhausted, there is a valid 'current protocol' to verify. The USLG sets up the dimming control lines to match the requirements of the 'current protocol'.

For every action in the 'current protocol', the USLG may take this action, wait a given amount of time associated with this action within the 'current protocol' action record information, and then reads current sensor measurements. If any of the measurements are outside the correlated range indicated by the sensor records list associated with this 'current protocol' and action, the USLG may move to the next protocol and start from the beginning to verify this new protocol. In cases where the sensor measurements meet the expected measurements indicated in the sensors list data range, the USLG may proceed to the next action in the list of 'current protocol'. In cases when there are no more actions to measure within the 'current protocol', the USLG may choose this 'current protocol' as the correct protocol for this device.

Protocol discovery can happen for multiple reasons. For example, when protocol discovery is initiated due to change in luminaire or when a new luminaire is being connected, the discovery protocol may add a step in which the base sensor parameters are updated to reflect the characteristics of the new luminaire. According to an aspect, this action helps set expected values and tune dimming parameters to sensor readings, such that appropriate correlation can be achieved. The USLG may keep historical correlated values for its sensor to enable correlation that is time dependent. For example, LED-based luminaire lumen values and the sensor readings may be impacted by the lumen state of the LED, and the lumen state and readings of the LED may deteriorate over time. According to an aspect, retaining/keeping historical or accumulated information may allow the USLG system to identify change in readings over time and to adjust the dimming directives to reflect the requested dimming level correctly.

Figure 13:
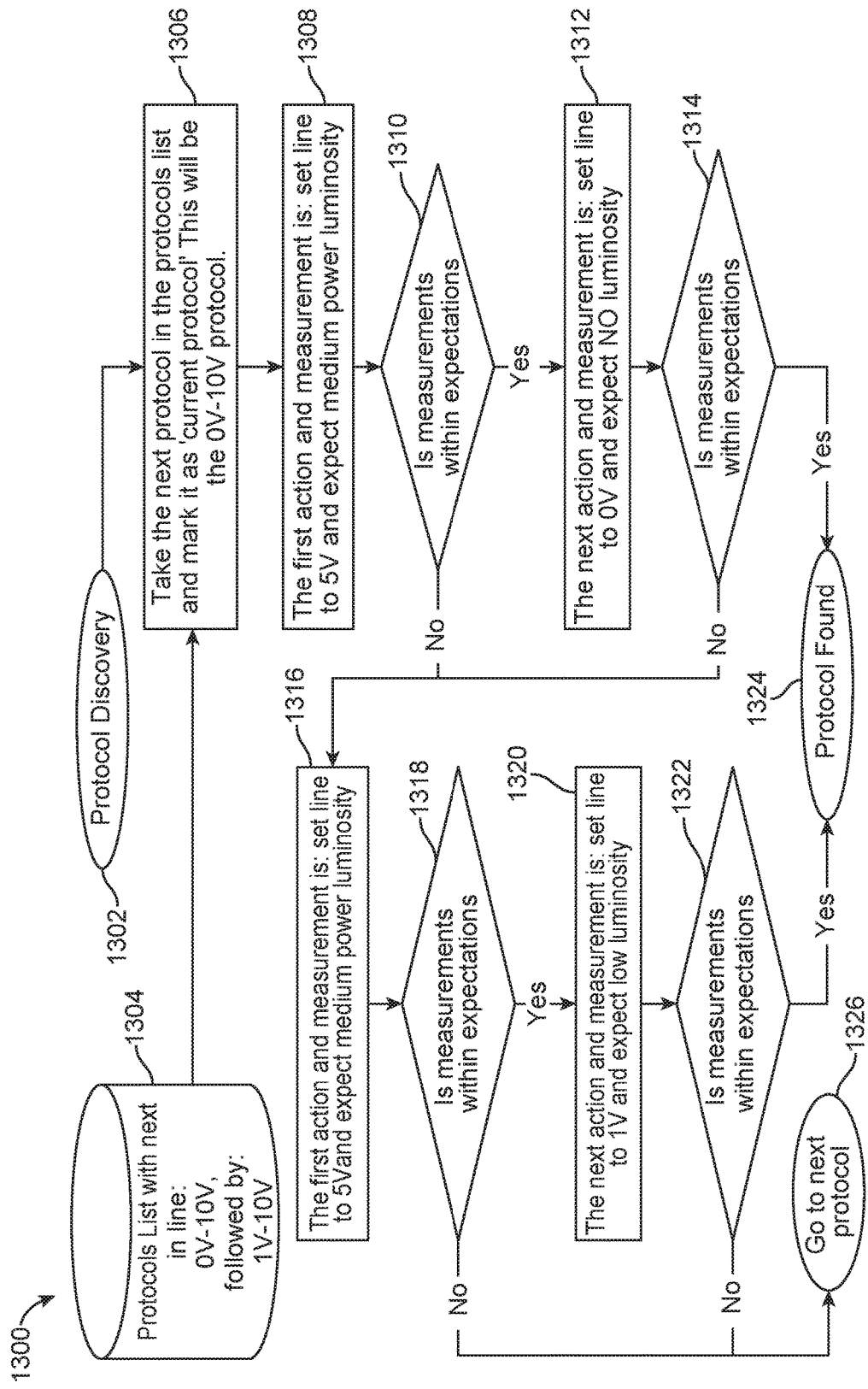
FIG. 13 is a flow chart illustrating discovery steps differentiating between 0V-10V and 1-10V protocols of a system, according to an embodiment.

According to an aspect, the at least one USLG may distinguish between a digital protocol and at least one analog protocol. In an embodiment, the digital protocol includes one of DALI and DMX, and the analog protocol includes one of 0V-10V and 1V-10V. FIG. 13 illustrates an embodiment 1300 of the protocol discovery process logic as it distinguishes between 0V-10V and 1V-10V protocols and chooses one or none if the current protocol is different. According to an aspect, at step 1304, the protocol list displays the protocols 0V-10V followed by 1V-10V. At step 1306, the USLG may select the next protocol in the protocol list and mark it as "current protocol" which is the protocol 0V-10V. At step 1308, a first action in the protocol may be to send/transmit at least one dimming control command (set the dimming control line) towards the plurality of luminaires, for instance, to 5V. This may reflect in about 50% dimming of the light, however, reading RGB and power sensors can determine accurate dimming values. In an embodiment, the dimming control command is command based on the real time sensing measurement and the at least one real time power measurement to generate a result. After the dimming control command is transmitted to the luminaire, the result is generated, which may require the luminaire to be dimmed. According to an aspect, the generated result does not require the luminaire to be dimmed. In an embodiment, the dimming control command is transmitted by the USLG. The generated result may be measured by the USLG. At step 1310, the measurements may be taken to see if they are within expectations. The measuring of the generated result may be via the at least one sensor subsystem and/or the at least one power meter. According to an aspect, the generated result is measured by the at least one USLG. If the measurements are within expectations, 'Yes', then the next step of operation may proceed to step 1312. If 'No', then the next step of operation may proceed to step 1316. In an embodiment, if the measurements of step 1310 are within expectations, 'Yes', then at step 1312 voltage on the line is turned off, e.g., set 0V of the dimming line. The expectation is that the light will drop to 0 with no luminosity, and the power meter may reflect low measurement values to reflect this. According to an aspect, the method includes discovering the at least one dimming control protocol installed in the plurality of luminaires. The dimming control protocol may be discovered by the at least one USLG. At step 1314, the measurements may be taken to see if they are within expectations. According to an aspect, if the measurements of step 1314 are 'Yes', then at step 1324 the exact protocol is found.

In an embodiment, if the measurements of step 1314 are 'No', then the next step of operation goes to step 1316. At step 1316, the operations performed in step 1308 may be performed again. At step 1318, the measurements may be taken to see if they are within expectations. According to an aspect, if they are within expectations, 'Yes', then the next step of operation goes to step 1320, where voltage on the line may be set as 1V of the dimming line, which reflects an expectation of low luminosity. At the next step 1322, the measurements may be taken again to see if they are within expectations. If the measurements of step 1322 are 'Yes', then the next step of operation may proceed to step 1324, thus evidencing that the protocol has been found. If the measurements of step 1322 are 'No', then the next step of operation goes to step 1326. According to an aspect, the step 1326 is only performed when 0V-10V protocol discovery fails and the USLG moves to the next protocol in the line, which is the 1V-10V.

According to an aspect, the starting point may be the 'current protocol', which points to the 0V-10V protocol. The USLG may set the internal soft switch selection to reflect 0V-10V protocol line set-up. In an embodiment, the first action in the protocol is to send (set the dimming control line) to 5V. This should reflect in about 50% dimming. According to an aspect, the RGB and power sensors may be read to assess the actual dimming levels. In an embodiment, if these levels meet expectations, the next step is to turn the voltage on the line OFF, that is, the voltage is set to 0V of the dimming line. The expectation is that the light will drop to 0 and the power meter to very low measurement to reflect this fact. If this is true, we have found our protocol.

In embodiments where the USLG supports a relay feature to control and to disconnect the current to the luminaire when the setting of the dimming line voltage is 0, the dimming protocol discovery starting process may disconnect the relay before start of this test. When the sensors sense the presence of light and/or a lumen value when the relay is disconnected, this may provide an indication that the luminaire is a maintained emergency luminaire/light fixture.

According to an aspect, if the 0V-10V protocol discovery failed, a 1V-10V protocol discovery process is initiated. In an embodiment, the method of discovering the at least one dimming control protocol includes controlling a dimming level of the plurality of luminaires. The dimming level may be controlled by the USLG 102, which may set the dimming control line, as seen for instance in FIG. 5, and described in further detail hereinabove, for a 1V-10V protocol. In an embodiment, the first action in the 1V-10V protocol is to set the dimming control line to 5V. This may reflect in about 50% dimming, however, accurate readings may be obtained via the RGB and power sensors. If these measured expectations are met, the next step may be to turn the voltage on the line to 1V on the dimming line. According to an aspect, the light/lux may then decrease/drop to low levels and the power meter may also reflect lower readings. If this occurs, the protocol has been discovered. Otherwise, the correct protocol has not yet been discovered.

In an embodiment, the 1V-10V protocol can be discovered by setting the dimming line to 1V and expect very low RGB intensity (about 5% lux) which will not change when the dimming lines are set to 0V. The same logic can be used to find a 0V-10V protocol, by setting the dimming line to 1V. This may result in some RGB intensity (about 5% lux), which will drop to very low RGB intensity (close to 0 lux) when the dimming lines are lowered to 0V.

Figure 14:
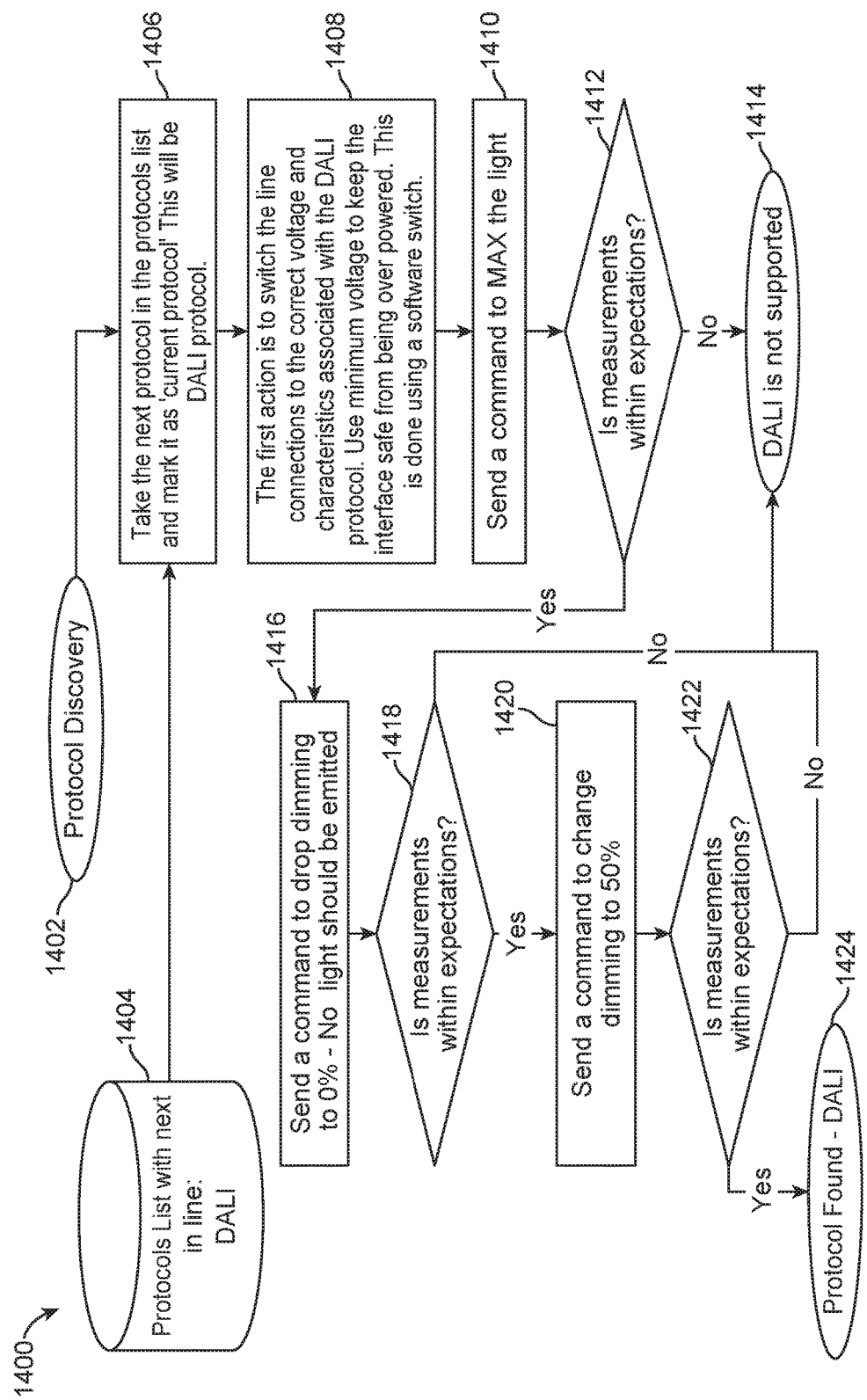
FIG. 14 is a flow chart illustrating discovery steps associated with differentiating between DALI protocol and other digital protocols of a system, according to an embodiment.

FIG. 14 depicts an embodiment 1400 of the protocol discovery process 1402 to select DALI protocol. According to an aspect, at step 1404, the protocol next in line is determined, which is a DALI protocol. At step 1406, the system may select the next protocol in line as "current protocol" which may be the DALI protocol. At step 1408, switching of current physical/electrical interface characteristics to DALI may be performed, while keeping the voltage to the minimum allowed by DALI. In an embodiment, minimum voltage is allowed to keep the interface safe from being over powered. This operation may be performed using a software switch. According to an aspect, at step 1410, a DALI command is sent to increase the lumen to 100% MAX light and wait for enough time for the command to take effect. At step 1412, the measurements may be taken to see if they are within expectations. If 'Yes', then the next step of operation may be proceed/go to step 1416. If 'No', then the next step of operation may proceed/go to step 1414. If the measurements of the step 1412 are 'No', then at step 1414 it becomes obvious this is not a DALI luminaire. If the measurements of step 1412 are 'Yes', then at step 1416 the system may send a command to shut off the light completely, i.e., maximum dimming/reduce the dimming level to 0%, and wait for some time for the command to take effect and read the sensors' measurements. In an embodiment, at step 1418, the measurements are taken to see if they are within expectations. If 'Yes', then the next step of operation goes to step 1420. If 'No', then the next step of operation goes to step 1414. If the measurements of the step 1418 are 'No', then at step 1414 it becomes obvious this is not a DALI luminaire. If the measurements of step 1418 are 'Yes', then at step 1420 the system sends a command to change the dimming to 50% and wait for some time for the command to take effect and read the sensors' measurements. At step 1422, the measurements may be taken to see if they are within expectations. If 'Yes', then the next step of operation goes to step 1424 and the system establishes that this is a DALI protocol. If 'No', then the next step of operation goes to step 1414 and it is determined that this is not a DALI luminaire.

In an embodiment, the DALI protocol discovery steps include: Switch the current physical/electrical interface characteristics to DALI while keeping the voltage to the minimum allowed by DALI. Send a DALI command to increase the lumen to 100% MAX light. Wait for enough time for the command to take effect. Use the sensors to measure the light and verify that the readings meet the expected range. If sensors show no change in measurements, while not meeting the expected value range, this luminaire does not support DALI. If the readings are in the expected range, continue and send a command to shut off the light, i.e., maximum dimming. Wait for some time for the command to take effect and read sensors' measurements. If the readings are not in the expected range, this is not a DALI luminaire, or else, the readings are in the expected range and the USLG can send a command to change dimming to 50%. If this works well, and is verified by sensor readings, then this luminaire supports the DALI protocol. Otherwise, it does not support the DALI protocol.

Figure 15:
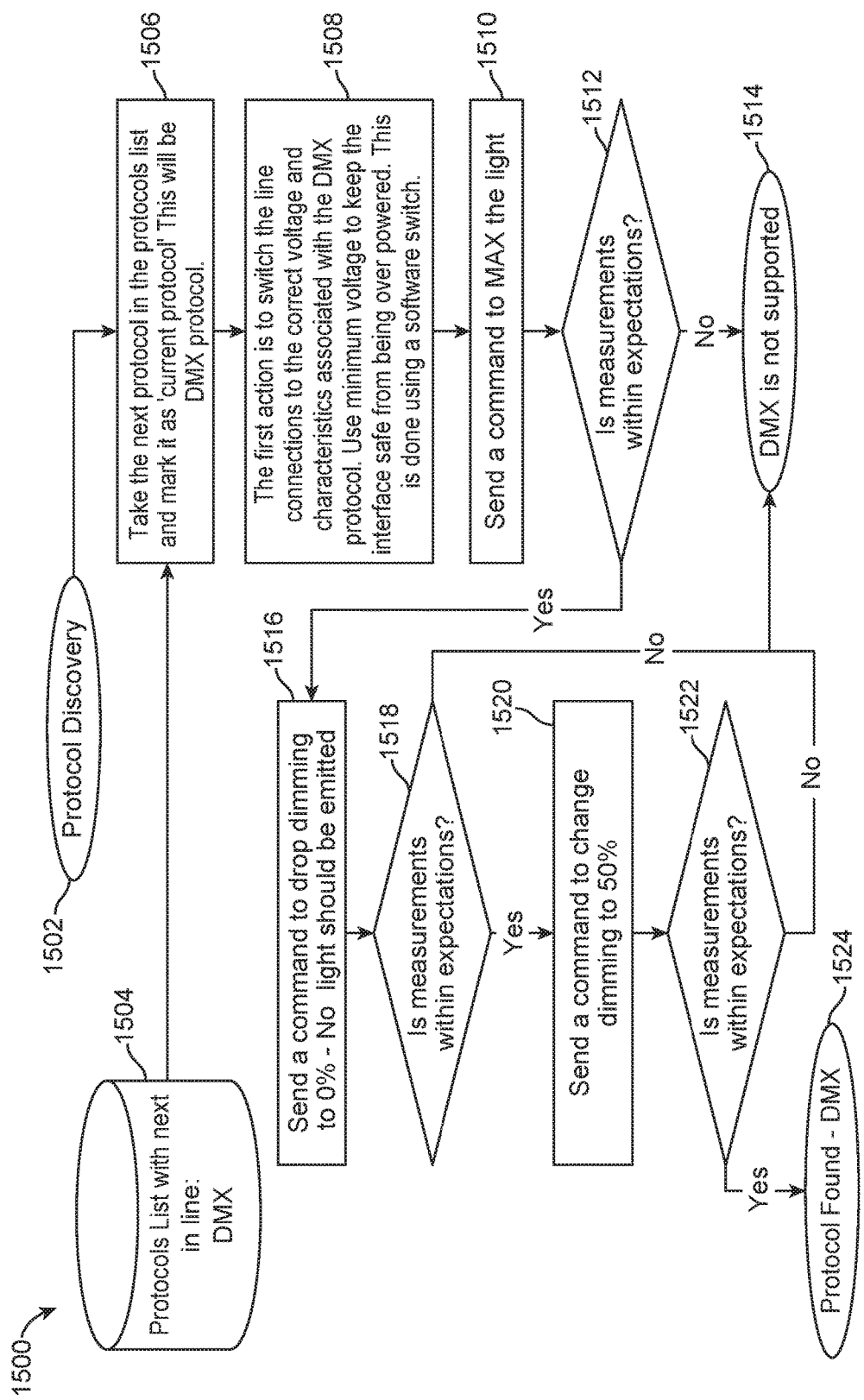
FIG. 15 is a flow chart illustrating discovery steps associated with differentiating between DMX protocol and other digital protocols of a system, according to an embodiment.

FIG. 15 illustrates an embodiment 1500 of a protocol discovery 1502 to select a DMX protocol. According to an aspect, at step 1504, the protocol next in line is determined which is the DMX protocol. At step 1506, the system may select the next protocol in line, that is the DMX protocol, as a "current protocol". At step 1508, switching of current physical/electrical interface characteristics to DMX may be performed, while keeping the voltage to the minimum allowed by DMX, which may be performed using a software switch. This minimum voltage may be allowed to keep the interface safe from being over powered. According to an aspect, at step 1510, a DMX command is sent to increase the lumen to 100% MAX light and wait for enough time for the command to take effect. At step 1512, the measurements may be taken to see if they are within expectations. If 'Yes', then the next step of operation goes to step 1516. If 'No', then the next step of operation goes to step 1514. If the measurements of the step 1512 are 'No', then at step 1514 it is determined/becomes obvious this is not a DMX luminaire. If the measurements of step 1512 are 'Yes', then at step 1516 the system may send a command to shut off the light completely, i.e., provide maximum dimming and wait some time for the command to take effect and read the sensors' measurements. In an embodiment, at step 1518, the measurements are taken to see if they are within expectations. If 'Yes', then the next step of operation goes to step 1520. If 'No', then the next step of operation goes to step 1514. If the measurements of the step 1518 are 'No', then at step 1514 it becomes obvious this is not a DMX luminaire. If the measurements of step 1518 are 'Yes', then at step 1520 the system may send a command to change the dimming to 50% and wait for some time for the command to take effect and read the sensors' measurements. According to an aspect, at step 1522, the measurements are taken to see if they are within expectations. If 'Yes', then the next step of operation goes to step 1524. If 'No', then the next step of operation goes to step 1514. If the measurements of step 1522 are 'Yes', then at step 1524 system establish the DMX protocol.

In an embodiment, the DMX protocol discovery steps include: Switch the current physical/electrical interface characteristics to DMX while keeping the voltage to the minimum allowed by DMX. Send a DMX command to increase the lumen to 100% MAX light. Wait for enough time for the command to take effect. Use the sensors to measure the light and verify that the readings meet the expected range. If sensors show no change in measurements, while not meeting the expected value range, this luminaire does not support DMX. If the readings are in the expected range, continue and send a command to shut off the light, i.e., maximum dimming. Wait for some time for the command to take effect and read sensors' measurements. If the readings are not in the expected range, this is not a DMX luminaire; otherwise, the readings are in the expected range and the USLG can send a command to change dimming to 50%. If this works well, verified by sensor readings, then this luminaire supports the DMX protocol, or else it does not.

The digital control signals that are utilized in the protocol discovery process may be specific to the protocol in such a way that the signal or set of signals can identify the protocol without ambiguity. In other words, thus, any detected change in the sensors' input information will demonstrate success. Repetition of the protocol discovery steps may help provide a clear determination that there is no single digital protocol that controls the device, or that there is a specific protocol that controls this device.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

While the system and method have been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

The present disclosure, in various embodiments, configurations and aspects, includes components, methods, processes, systems and/or apparatus substantially depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects, for the purpose of streamlining the disclosure. The features of the embodiments, configurations, or aspects of the present disclosure, may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for discovering at least one dimming control protocol installed in a plurality of lighting devices and for controlling a plurality of dimming levels of the plurality of lighting devices, the system comprising:
   at least one protocol agnostic Universal Smart Lighting Gateway, the Universal Smart Lighting Gateway configured for discovering the at least one dimming control protocol installed in each of the plurality of lighting devices and controlling the dimming levels of each of the plurality of lighting devices;
   a plurality of luminaires, wherein the plurality of luminaires is physically connected to the at least one protocol agnostic Universal Smart Lighting Gateway via at least one dimming control interface;
   at least one sensor subsystem, wherein the sensor subsystem senses a plurality of color channel and monitors at least one change in light and environment in real time, and wherein the sensor subsystem is connected with the at least one of the protocol agnostic Universal Smart Lighting Gateway; and
   at least one power meter for measuring power in real time, wherein the at least one power meter is connected with the at least one of the protocol agnostic Universal Smart Lighting Gateway.

2. The system of claim 1, wherein the at least one protocol agnostic Universal Smart Lighting Gateway discovers the at least one dimming control protocol, the dimming control protocol comprising one of 0V-10V, 1V-10V, DALI, and DMX.

3. The system of claim 1, wherein the plurality of luminaires comprise a plurality of LED's, and the plurality of luminaires are configured to receive at least one dimming control command from the at least one protocol agnostic Universal Smart Lighting Gateway during a protocol discovery process, the dimming control command being transmitted via the at least one dimming control interface.

4. The system of claim 1, wherein the at least one sensor subsystem comprises at least one of a color sensor and at least one environment sensor.

5. The system of claim 4, wherein the at least one color sensor faces the plurality of luminaires, and senses at least one of a color content and a color intensity of at least one of the plurality of luminaires and the plurality of LED's.

6. The system of claim 4, wherein the at least one environment sensor senses a nearby environment of the plurality of luminaires while facing away from the plurality of luminaires.

7. The system of claim 4, wherein the at least one environment sensor comprises at least one of an ambient light sensor, and a temperature sensor.

8. The system of claim 1, wherein the at least one protocol agnostic Universal Smart Lighting Gateway is connected to at least one network gateway in a backhaul via at least one of a LAN, a WLAN, a WAN, and a Mesh BLE radio network.

9. The system of claim 8, wherein the at least one network gateway is connected to at least one cloud server in the backhaul via one of a WAN and a LAN.

10. The system of claim 1, wherein the Universal Smart Lighting Gateway discovers the at least one dimming control protocol by:
   assuming a dimming control protocol, and then
   receiving real time sensing measurements from the sensor subsystem and real time power measurements from the power meter, and then measuring a generated result to discover the at least one dimming control.

11. The system of claim 1, wherein the Universal Smart Lighting Gateway discovers the at least one dimming control protocol by changing dimming protocols until a correct dimming protocol has been discovered.

12. The system of claim 1, further comprising:
at least one cloud server in communication with the Universal Smart Lighting Gateway, wherein the at least one cloud server interrogates the Universal Smart Lighting Gateway to determine which at least one dimming control protocol the Universal Smart Lighting Gateway is using.

13. The system of claim 1, wherein the Universal Smart Lighting Gateway interrogates the at least one luminaire to determine which dimming protocol the at least one luminaire is using.

14. The system of claim 13, wherein the Universal Smart Lighting Gateway reads an RFid tag on the at least one luminaire and the RFid tag includes information detailing the dimming protocol used by the at least one luminaire.

15. The system of claim 13, wherein the Universal Smart Lighting Gateway communicates with the at least one luminaire over a Bluetooth connection to obtain information detailing the dimming protocol used by the at least one luminaire.

16. The system of claim 12, further comprising:
a crypto device configured for encoding the communication between the at least one cloud server and the Universal Smart Lighting Gateway.

17. The system of claim 1, wherein the at least one protocol agnostic Universal Smart Lighting Gateway distinguishes between a digital protocol and at least one analog protocol.

18. The system of claim 17, wherein the digital protocol comprises one of DALI and DMX, and the analog protocol comprises one of 0V-10V and 1V-10V.

19. The system of claim 1, wherein the at least one protocol agnostic Universal Smart Lighting Gateway is connected to the at least one power meter via a Universal Asynchronous Receiver/Transmitter interface.

20. The system of claim 10, wherein the at least one protocol agnostic Universal Smart Lighting Gateway utilizes the at least one real time sensing measurement and at least one real time power measurement to correlate between the at least one dimming control protocol, and between the plurality of luminaires.

* * * * *